(12) United States Patent
Rackley, III et al.

(10) Patent No.: US 11,501,377 B2
(45) Date of Patent: *Nov. 15, 2022

(54) SYSTEM AND METHOD FOR DYNAMIC INSURANCE COVERAGE IN A SUBSCRIPTION VEHICLE SERVICE

(71) Applicant: CLUTCH TECHNOLOGIES, LLC, Atlanta, GA (US)

(72) Inventors: Brady L. Rackley, III, Atlanta, GA (US); John R. Phelps, Jr., Atlanta, GA (US); Adam J. Carley, Atlanta, GA (US); Vincent G. Zappa, Atlanta, GA (US); Steven S. Neel, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/670,337

(22) Filed: Oct. 31, 2019

(65) Prior Publication Data
US 2020/0065910 A1    Feb. 27, 2020

Related U.S. Application Data

(63) Continuation of application No. 15/187,494, filed on Jun. 20, 2016, now Pat. No. 10,580,081, which is a
(Continued)

(51) Int. Cl.
*G06Q 40/08*    (2012.01)
*G06Q 10/10*    (2012.01)
*G06Q 30/06*    (2012.01)

(52) U.S. Cl.
CPC .......... *G06Q 40/08* (2013.01); *G06Q 10/105* (2013.01); *G06Q 30/0645* (2013.01)

(58) Field of Classification Search
CPC ... G06Q 10/105; G06Q 30/0645; G06Q 40/08
(Continued)

(56) References Cited

U.S. PATENT DOCUMENTS

2006/0053038 A1    3/2006    Warren
2007/0226014 A1    9/2007    Alemayehu
(Continued)

OTHER PUBLICATIONS

Google NPL (non-patent literature) Search, dated Jan. 15, 2022. (Year: 2022).*
(Continued)

*Primary Examiner* — Hai Tran
(74) *Attorney, Agent, or Firm* — Smith Tempel Blaha LLC; Matthew T. Hoots

(57) ABSTRACT

Embodiments of methods and systems for dynamic insurance of clients with access to a shared asset pool through a subscription vehicle service are disclosed. An exemplary embodiment of a method for dynamic insurance leverages a subscription vehicle service platform to collect data elements associated with each driver-to-vehicle combination in the subscription vehicle service. Using the collected data elements, embodiments package the data elements according to predefined preferences of one or more insurance providers. When a present driver-to-vehicle combination associated with a given client changes, the packaged data elements are provided to the insurance providers in order to solicit quotations, or approval, or continuation of current policy for the new driver-to-vehicle combination. In this way, constantly updated data elements derived from the client's use of the service provide accurate information for optimized insurance coverage based on the client's active driver-to-vehicle combination.

9 Claims, 14 Drawing Sheets

Related U.S. Application Data continuation of application No. 15/187,243, filed on Jun. 20, 2016, now Pat. No. 10,580,080, which is a continuation-in-part of application No. 14/847,881, filed on Sep. 8, 2015, now abandoned.

(60) Provisional application No. 62/046,813, filed on Sep. 5, 2014.

(58) Field of Classification Search
USPC .................................................. 705/4
See application file for complete search history.

(56) References Cited

U.S. PATENT DOCUMENTS

| | | |
|---|---|---|
| 2010/0030582 A1 | 2/2010 | Rippel |
| 2010/0030586 A1 | 2/2010 | Taylor |
| 2010/0063850 A1 | 3/2010 | Daniel |
| 2011/0125536 A1 | 5/2011 | Reynolds |
| 2013/0006675 A1* | 1/2013 | Bowne ................ G07C 5/0858 705/4 |
| 2015/0187013 A1 | 7/2015 | Adams |
| 2015/0187014 A1* | 7/2015 | Adams ................ G06Q 40/08 705/4 |
| 2015/0187015 A1 | 7/2015 | Adams |
| 2015/0187016 A1 | 7/2015 | Mams |
| 2015/0294422 A1 | 10/2015 | Carver |
| 2016/0110650 A1 | 4/2016 | Basir |
| 2016/0364783 A1 | 12/2016 | Ramanuja |

OTHER PUBLICATIONS

Google Scholar NPL (non-patent literature) Search, dated Jan. 15, 2022. (Year: 2022).*

* cited by examiner

SYSTEM AND METHOD FOR DYNAMIC INSURANCE COVERAGE IN A SUBSCRIPTION VEHICLE SERVICE

PRIORITY AND RELATED APPLICATIONS STATEMENT

This application claims priority under 35 U.S.C. § 120 and is a continuation of U.S. patent application Ser. No. 15/187,494, filed Jun. 20, 2016 and entitled, "SYSTEM AND METHOD FOR DYNAMIC INSURANCE COVERAGE IN A SUBSCRIPTION VEHICLE SERVICE," which is a continuation of U.S. patent application Ser. No. 15/187,243, filed Jun. 20, 2016 and entitled, "SYSTEM AND METHOD FOR DYNAMIC INSURANCE COVERAGE IN A SUBSCRIPTION VEHICLE SERVICE," which is a continuation-in-part of U.S. patent application Ser. No. 14/847,881, filed on Sep. 8, 2015 and entitled, "SYSTEM AND METHOD FOR MANAGING RISKS AND SCHEDULING OPERATIONS FOR A SERVICE OFFERING SUBSCRIPTION VEHICLE ACCESS," which is a non-provisional application of U.S. Provisional Patent Application 62/046,813, filed on Sep. 5, 2014 and entitled "SYSTEM AND METHOD FOR CONTROLLING RISKS, ADMINISTERING ASSETS, AND SCHEDULING OPERATIONS FOR A SERVICE OFFERING SUBSCRIPTION VEHICLE ACCESS." The entire contents of these applications are hereby incorporated by reference.

DESCRIPTION OF THE RELATED ART

The parent application to this disclosure addresses a need in the art for a system and a method of controlling risks, administering assets, scheduling operations, and providing highly personalized customer service for a service offering subscription vehicle access. As one of ordinary skill in the art would expect, a provider of a subscription vehicle service, as well as a client to a subscription vehicle service, may have a need for insurance. Depending on the goal of the insured as well as applicable laws and regulatory requirements, the insurance provided may be attached to the vehicle asset itself, the driver of the vehicle asset (i.e., the subscription vehicle service client and any authorized secondary drivers associated with the client), or both.

Systems and methods of insurance presently known in the art, however, are not very well suited for efficient and cost effective coverage of a vehicle or driver associated with a subscription vehicle service. For example, personal insurance offerings known in the art are primarily underwritten for a specific, predefined and fixed driver-to-vehicle combination. Notably, however, in a subscription vehicle service application a driver-to-vehicle combination is not specific, predefined or fixed—in fact, it's very dynamic. Additionally, commercial insurance offerings known in the art are commonly underwritten for a specific, predefined and fixed vehicle (i.e., a VIN) to be driven by any of a certain "eligible and covered" group of drivers under the employ of the vehicle owner. Notably, however, in a subscription vehicle service application a group of "eligible and covered" drivers smaller than the entire client group for the service cannot be defined and, further, unlike an "eligible and covered" group of drivers in a commercial context, a group of drivers from a client pool for a subscription vehicle service are not associated with one another via a common employer.

Therefore, there is a need in the art for a system and method of dynamic insurance coverage suitable for efficiently and cost effectively underwriting clients and/or vehicle assets in a subscription vehicle service application.

SUMMARY OF THE DISCLOSURE

Various embodiments of methods and systems for dynamic insurance policies and coverage of clients with access to a shared asset pool through a subscription vehicle service are disclosed. An exemplary embodiment of a method for dynamic insurance leverages a subscription vehicle service platform to collect data elements associated with each driver-to-vehicle combination in the subscription vehicle service. Then, for a given client of the service, the method recognizes generation of a new driver-to-vehicle combination that may coincide with termination of a previous driver-to-vehicle combination for that client. In response to the newly generated driver-to-vehicle combination, the method packages the collected data elements for the client and provides the packaged data elements to an insurance provider that is underwriting a policy that covers the client, the asset, or both within the subscription vehicle service. Notably, the particular combination of data elements that form a package of data elements may vary according to predefined preferences of the particular insurance provider doing the underwriting. The method may then receive feedback from the insurance provider regarding the new or proposed driver-to-vehicle combination and, based on the feedback, either authorize or not authorize the driver-to-vehicle combination. In some embodiments, it is envisioned that the feedback from the insurance provider may include approval of the proposed driver-to-vehicle combination contingent on modification of the premium or assessment of an upcharge. It is also envisioned that feedback from the insurance provider may include a modification of the premium that reduces a previous premium. It is also envisioned that a stored value account associated with the client may be debited for the insurance premium and/or upcharge.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. The specific letter character designation "N" or "n" is meant to indicate that the particular element is not limited to any specific quantity. Letter character designations for reference numerals may be omitted when it is intended that a reference numeral to encompass all parts having the same reference numeral in all Figures.

DETAILED DESCRIPTION

Figure 1A:
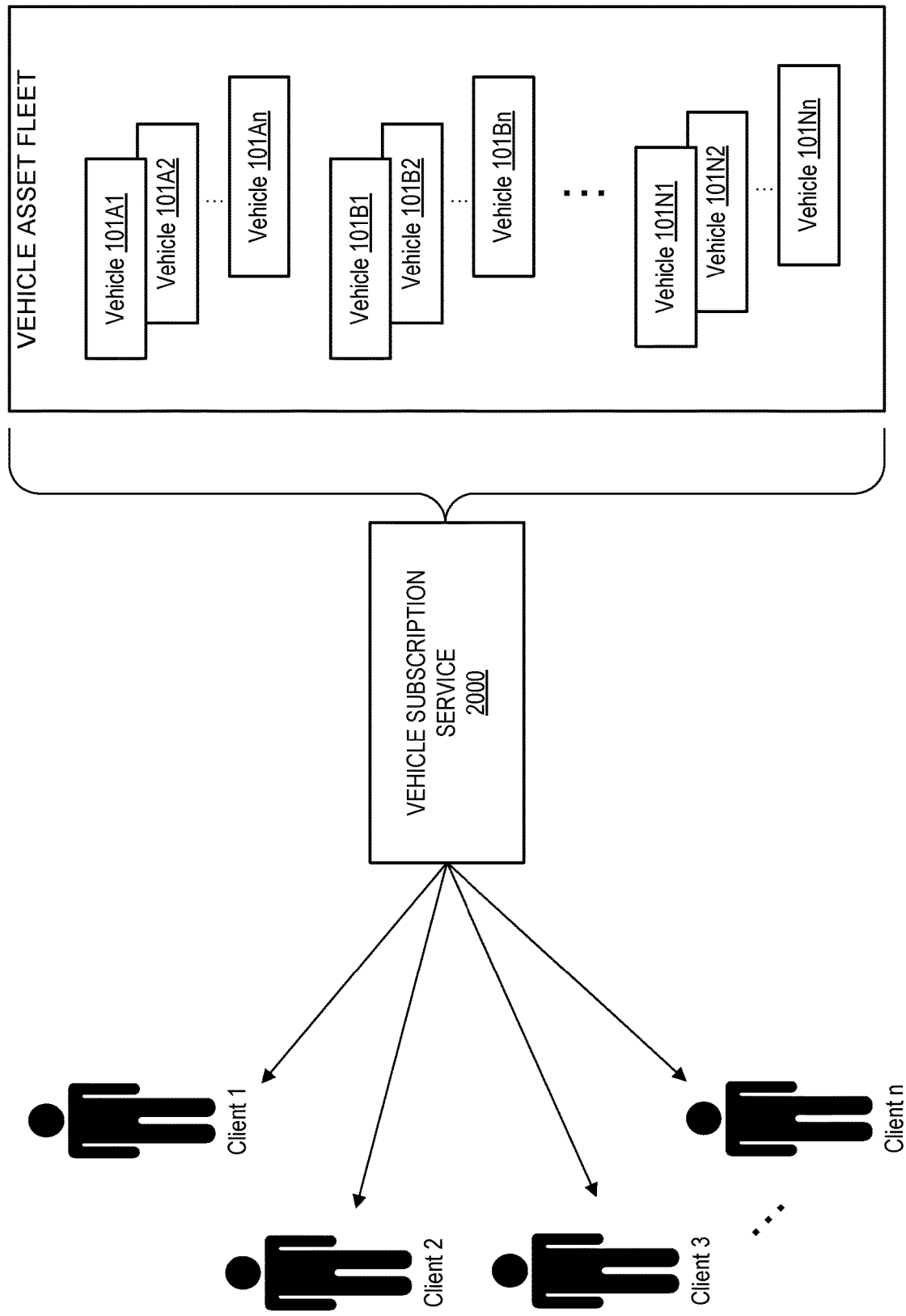
FIG. 1A illustrates the extent and nature of driver-to-vehicle combinations in a subscription vehicle service environment.

The term "exemplary" is used herein to mean serving as an example, instance, or illustration. Any aspect described herein as "exemplary" is not necessarily to be construed as preferred or advantageous over other aspects.

The term "application" may include files having executable content, such as: object code, scripts, byte code, markup language files, and patches. In addition, an "application" referred to herein, may also include files that are not executable in nature, such as documents that may need to be opened or other data files that need to be accessed.

The term "content" may include files having executable content, such as: object code, scripts, byte code, markup language files, and patches. In addition, "content" referred to herein, may also include files that are not executable in nature, such as documents that may need to be opened or other data files that need to be accessed.

The terms "component," "database," "module", service," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The terms "communication device," "wireless device," "wireless telephone," "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device (a "PCD") may include a cellular telephone, a pager, a PDA, a smartphone, a navigation device, or a hand-held computer with a wireless connection or link.

A "subscription" is an account with the service. A "subscriber" or "client" is a named person who has entered into a contract for service and is listed on the account. A "driver" or "named driver" is a person who has been approved by the service to drive one or more vehicles associated with the account on a habitual basis or for an extended period of time. A subscription may have multiple drivers listed on the account. A subscription account may have one or more vehicles assigned to it at any period in time. Each driver may be approved to drive one, some or all of the vehicles assigned to the account.

A "predictive feature" or "feature" is defined as, in the practice of machine learning and pattern recognition, an individual measurable property of a phenomenon being observed. Choosing informative, discriminating and independent features may be a crucial step for effective algorithms in pattern recognition, classification and regression. Features are usually numeric, but structural features such as strings and graphs are used in syntactic pattern recognition. The concept of a "feature" is related to that of a "dependent variable" (or "explanatory variable") used in statistical techniques such as linear regression.

The term "possession" is used herein to denote the period of time during which a vehicle is assigned to a subscriber or client and is in the custodianship of that subscriber or client. This concept is distinct from "rental" for at least the reason that when a vehicle is rented, the amount paid is a function of the time that the subscriber has the vehicle. Under a subscription service, the payment may comprise a flat fee that does not depend on either the duration of possessions or the frequency of swaps.

The present disclosure and its parent disclosure generally relates to a system for and a method of controlling risks, administering assets, and scheduling operations for a service offering subscription vehicle access. More specifically, exemplary embodiments relate to a system for and a method of providing:

(1) a subscription vehicle service configured to use carefully culled subscriber/user driving habit data;
(2) vehicle assets with multipurpose and special purpose usage-tracking technology;
(3) specialty-designed processes configured to anticipate and calculate subscriber demand and preferred/promotional service rates; and
(4) dynamic insurance coverage based on driver-to-vehicle combinations and historical and predictive driving habit data.

The exemplary embodiment emphasizes a subscription vehicle service primarily influenced by market efficiencies and capable of extending uniquely tailored service rates and offering service, including insurance coverage, according to uniquely tailored parameters to individual subscribers.

Even more specifically, one exemplary embodiment of the system and method of the present disclosure is configured to manage the risks associated with vehicle assets from a subscriber's possession. Managing the risks associated with the vehicle assets may be achieved by monitoring and processing the current condition of each vehicle asset, by monitoring and processing the change in vehicle asset condition caused by specific subscriber(s)/driver(s), and by monitoring and processing the effects of specific driving patterns and/or external conditions on the vehicle asset. Managing the risks associated with the vehicle assets may involve quantifying, via a Driver Score, for example, the possible risk that a subscriber/driver may pose to a vehicle asset. A "Driver Score", as used herein, may denote a number calculated by an algorithm, model or heuristic, taking as input telematics and other data collected as a result of a driver's behavior and use of vehicle assets, and so designed that the output numbers serve to express an evaluation of the driver in terms of the expected cost, risk and or revenue associated with having that driver as a user of the service, relative to other users of the service.

In one exemplary embodiment, the possible effects of the driving behavior of a subscriber(s)/driver(s), and the associated costs that the subscription service will incur, may be taken into consideration within the computed Driver Score. Moreover, the Driver Score may comprise, but is not limited to, projected cost of accidents per day in possession, rate of depreciation per day in possession, cost of maintenance per day in possession, etc. The Driver Score may be calculated at a subscriber level, a driver level, and/or a driver to vehicle ("DTV") combination level, depending on the level of confidence of who was driving during each trip.

Furthermore, exemplary embodiments of the system and method of the present disclosure are configured to manage a fleet of vehicle assets. Vehicle asset management may be achieved through strategic practices that maximize "good outcomes" (e.g., paid-for hours in possession of a subscriber; customer satisfaction with vehicle; value realized when asset is sold) and minimize both maintenance costs and "bad outcomes" (e.g., vehicle breakdowns while in possession of a subscriber; "outage" hours when vehicle is not available for use by subscribers because of poor condition).

Furthermore, one exemplary embodiment of the system and method of the present disclosure is configured to predict & fulfill demand for services related to vehicle assets as effectively as possible. Predicting and fulfilling demand for services related to vehicle assets may be achieved via several software application services configured to maximize request fulfillment rates and absolute paid hours, while minimizing operations costs. In one non-limiting example, demand for services related to vehicle assets may be expressed in terms of the number of vehicles need for subscriber(s)/driver(s), and in terms of the pending/predicted requests for vehicle asset swaps. Future demand for services related to vehicle assets may be modeled as a function of historical demand (absolute and growth), number of subscribers, number of drivers, price, vehicle assortment, time of the year/week/day, customer mix, economic growth, projected weather patterns, planned events (e.g., major sports games, entertainment events) and other relevant variables.

Furthermore, exemplary embodiments of the system and method of the present disclosure are configured to fulfill subscriber's/driver's preferences and adjusting insurance coverage in view of fulfillment of those preferences. Fulfilling subscriber's/driver's preferences may be achieved by analyzing historical vehicle selections, travel patterns, driving styles, and account information, and generating recommendations on vehicles, time of swaps, and ancillary services (such as dynamic insurance adjustments). Fulfilling subscriber's/driver's preferences may allow the system to encourage subscribers/drivers to increase the frequency of swaps and the breadth of vehicles and occasions addressed, thereby triggering dynamic adjustments of insurance coverage for each change in a driver-to-vehicle pairing.

Furthermore, exemplary embodiments of the system and method of the present disclosure are configured to influence the subscriber's/driver's behavior towards vehicle asset. Influencing the subscriber's/driver's behavior towards vehicle assets may be achieved by leveraging the system to positively reinforce certain desired driving and maintenance behaviors that, in turn, may be used to adjust a dynamic insurance coverage for the subscriber. Influencing behavior may involve monitoring and processing a specific Driver Score and determining how it responds over time to any presented positive feedback.

Turning now to the drawings, FIG. 1A illustrates the extent and nature of driver-to-vehicle combinations in a subscription vehicle service environment. As can be understood from the FIG. 1A illustration, in a subscription vehicle service environment any one of a client pool at any time may be paired with any vehicle from a vehicle asset fleet to form a unique driver-to-vehicle ("DTV") combination. Notably, the clients are not necessarily associated with one another beyond their common participation in the subscription vehicle service 2000. That is, while it is envisioned that more than one client may be associated with a single account of the subscription service 2000 (such as, for example, two clients who are husband and wife), it is a given within a subscription vehicle service environment that the clients within the client pool may be and usually are unrelated to one another and, consequently, are associated with different accounts. In this way, it will be understood for the purpose of the FIG. 1A illustration that clients 1, 2, 3, . . . n are separate clients with unique preferences, unique payment sources, unique credit ratings, unique insurance risks/coverage, unique driving habits, unique driving patterns, etc.

For example, at a given point in time client 1 may be paired with vehicle 101A1 while client 2 is paired with vehicle 101B2, client 3 is paired with vehicle 101A2, etc. Subsequently, client 1 may have a need for a vehicle of the type 101B and, as such, return vehicle 101A1 to the subscription vehicle service in exchange for a vehicle of type 101B. Because vehicle 101B2 is paired with client 2, however, it should be clear that the service cannot pair client 1 with the specific vehicle 101B2 at the time of exchange. The system, however, may have vehicle 101B1 ready and available, though, and satisfy the need of client 1 by pairing him with vehicle 101B1.

Notably, considering the simple scenario outlined above, after client 1 has "flipped" his vehicle from vehicle 101A1 to vehicle 101B1, both clients 1 and 2 are presently paired with a vehicle of type 101B. Even so, because the particular features and conditions of the type 101B vehicles may differ somewhat, and because clients 1 and 2 may present different underwriting risks when driving a vehicle of type 101B (for any of a number of reasons), and because the clients 1 and 2 are not related or associated outside of their common participation in the service, their respective insurance coverage may differ. Moreover, client 1 having flipped his vehicle from type 101A to a type 101B necessarily dictates that his insurance coverage should ideally adjust for optimal coverage in view of the new driver-to-vehicle pairing.

Figure 1B:
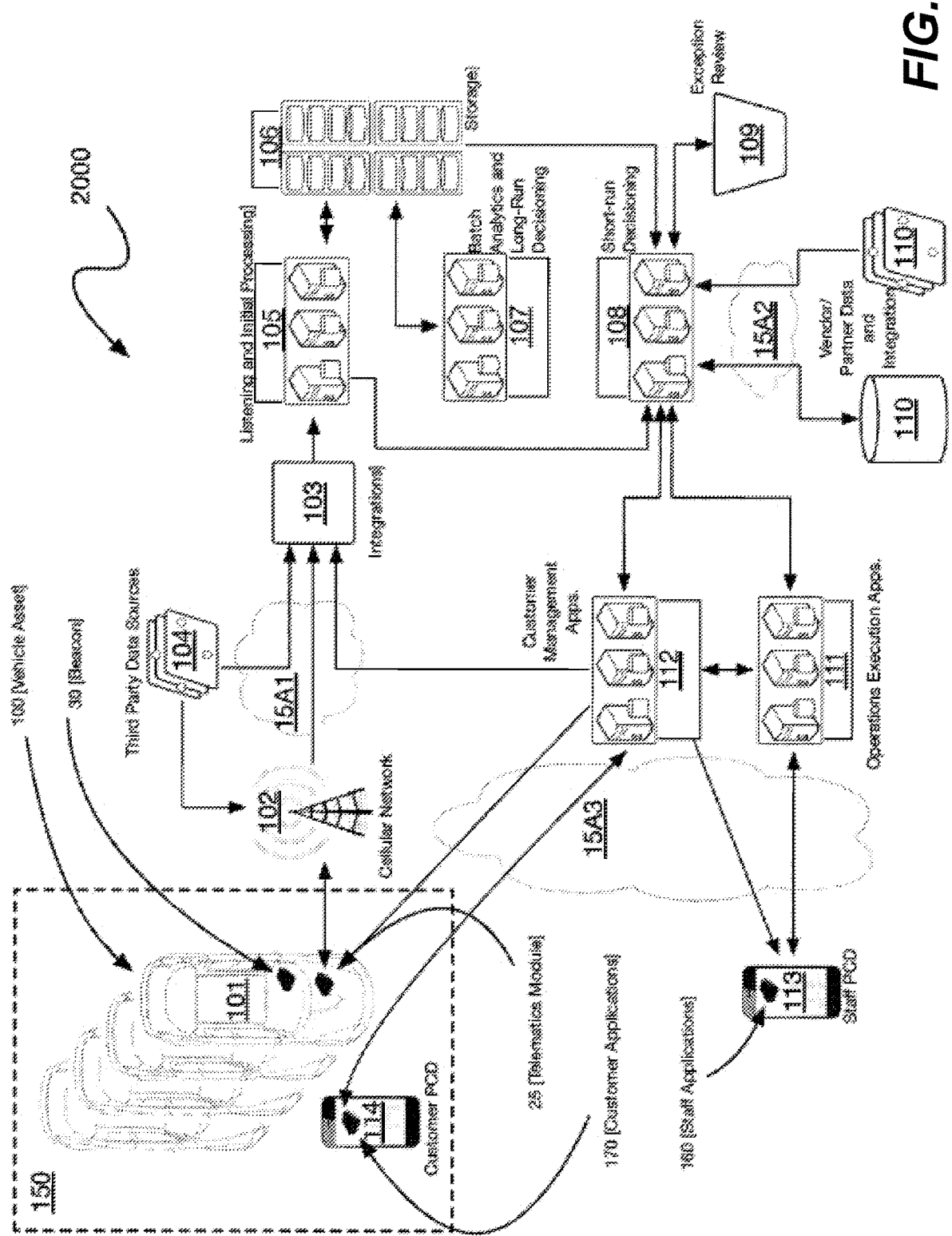
FIG. 1B is a high level block diagram of one exemplary embodiment of the system with its components spread out over an exemplary communications network.
Figure 1C:
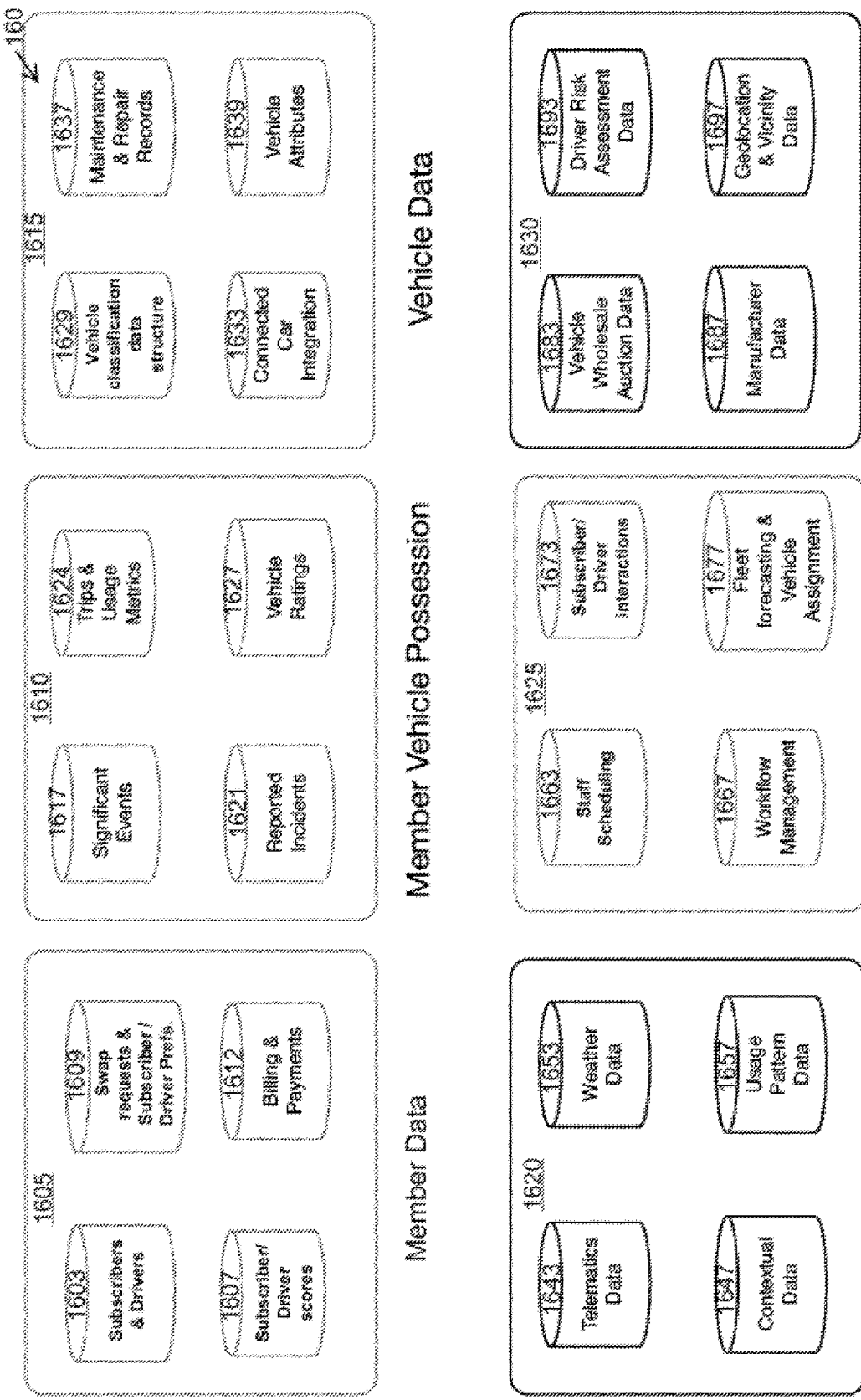
FIG. 1C illustrates a data architecture diagram with different data elements that are divided into six blocks corresponding to the storage block of FIG. 1B.

Reflecting on the FIG. 1 illustration, one of ordinary skill in the art of insurance coverage and underwriting will recognize the unique challenges associated with insuring clients and/or vehicles within a subscription vehicle service environment. A given client, for instance, at any given time may be paired with any one of a large fleet of vehicles; yet, that client may never be paired with a given vehicle in the fleet or may never be paired twice with the same vehicle. As a caveat, while it's feasible to simply insure the vehicle or the client with a "one size fits all scenarios" type insurance policy, doing so dictates that the policy will rarely, if at all, be optimized for the active driver-to-vehicle combination. Aspects of the subscription vehicle service 2000 according to an embodiment of the solution, as more particularly described relative to FIGS. 1B and 1C and in the incorporated parent disclosure, provide opportunity to dynamically adjust and optimize insurance coverage for a given client in view of the specific vehicle (as opposed to a broader vehicle class) in the active DTV combination, the historical driving patterns of the client, the active driving conditions, the likely driving scenarios, the specific time windows for driving, etc. Exemplary embodiments of a system and method for dynamic insurance within a subscription vehicle service will be described in more detail relative to subsequent figures.

FIG. 1B is a high level block diagram of one exemplary embodiment of the system 2000 with its components spread out over an exemplary communications network. System 2000 of FIG. 1, or any other embodiment of the present disclosure, may comprise a vehicle asset fleet 101, third party data source 104, integration service 103, listening and initial processing service 105, storage service 106, batch analytics and long-run decisioning service 107, short-run decisioning service 108, vendor/partner data and integration service 110, operations execution applications 111, customer management applications 112, staff PCD 113 executing staff applications 160, and customer PCD 114 executing customer applications 170

System 2000 may comprise a communications-network 15A that may include, but is not limited to, a cellular network 102, or any other wired or wireless communications links, network routers, switches, processors, relays, transmitters, broadcasters, etc. Wireless communication links may include, but are not limited to, radiofrequency ("RF") links, such as, BLUETOOTH™ RF links, WIFI™ RF links, as well as infrared links, acoustic links, and other wireless mediums. Each of these elements may be coupled to one another through a computer communications network. The computer communications network 15A may comprise a wide area network ("WAN"), the plain-old-telephone-system ("POTS"), a local area network ("LAN"), the Internet, or any combination of these and other networks.

Vehicle asset fleet 101 of System 2000 may comprise vehicle assets 100 of any make/model, type, range, configuration, size, etc. The vehicle assets 100 of the vehicle asset fleet 101 may be drivable or self-drivable or any combination thereof. The vehicle assets 100 may be divided into various groupings or fleets 101. Each individual vehicle asset fleet 101 may have a particular purpose or serve a particular market. In one exemplary embodiment, certain vehicle asset fleets 101 may be the primary vehicle assets for the subscription vehicle service, while certain other vehicle asset fleets 101 may be reserve/backup/auxiliary vehicle assets.

The individual vehicle assets 100 may comprise a built-in OEM and/or after-market telematics module 25, on-board or partially on-board computing devices/systems, and a communications-network link module configured to access the communications-network 15A. A telematics module 25 may comprise an apparatus installed within a vehicle asset 100, or an apparatus communicating with an external system from the proximity of the vehicle asset 100. The telematics module 25 may be configured to perform computations on the data from on-board sensors (GPS, accelerometer, barometer, etc.) and/or to communicate with an external system that is externally tracking the vehicle asset 100. The telematics module 25 may also be configured to store data, to transmit data over the communications-network 15A, to receive messages/content, to process data/content, and/or to affect control over the vehicle asset 100.

In one exemplary embodiment, the telematics modules 25 may be installed directly on board the vehicle assets 100. The telematics module 25 may comprise the commercially available LMU 26201 offered by CalAmp Corporation. The telematics module 25 may comprise a microprocessor, a cellular modem with antenna for communication with cellular network 102, a GPS receiver and a 3-axis accelerometer. The telematics module 25 may be communicatively coupled with the exemplary vehicle's on-board-diagnostics (OBD-11) port interface and with wiring into the relays controlling the vehicle's starter motor, locking system, etc. The telematics module 25 may use its own microprocessor and resources, those of the vehicle asset 100, and/or those of a portable computing device/network server independent of the vehicle asset 100.

One of ordinary skill in the art understands that telematics modules 25 of a vehicle asset 100 are increasingly being built directly into vehicles by manufacturers and, in some cases, those capabilities may be made available for use by a subscription vehicle access service like that of the present disclosure. Moreover, the vehicle asset 100 may comprise an original equipment manufacturer (OEM) application programming interfaces (API's) that are used by the telematics module 25 and/or any other system component.

Furthermore, the telematics module 25 of a vehicle asset 100 may execute pre-installed software configured to log certain measurements. The measurements available may comprise accelerometer readings, GPS coordinates and parameters available within ODB2 protocol such as vehicle speed, engine speed, and odometer reading. The telematics module 25 may log measurement readings either on a timed basis or when it identifies that a triggering event has occurred. In one exemplary embodiment, the telematics module 25 may capture the following timed data readings over predetermined time intervals, such as, but not limited to, every ten seconds:

Vehicle asset location.
Vehicle asset speed.
Relative distance to other vehicles and other objects.
Throttle position.
RPM.
Torque.
Fuel level.
Tire pressure.
Malfunction Indicator Lamp status.
Diagnostic Trouble Codes currently flagged.
Any standard PIO available under ODB-11 or similar standards.

More comprehensive time-based logging of the available measurements may be scheduled on a less frequent basis, such as once daily when the engine first turns on. Other predetermined time intervals are possible and are included within the scope of this disclosure. Other time intervals include, but are not limited to, every two seconds, five seconds, minute, ten minutes, fifteen minutes, thirty minutes, hour, two hours, six hours, once a day, once a week, once a month, etc.

Furthermore, to identify a meaningful telematics data event, the telematics module 25 of a vehicle asset 100 may be configured to monitor certain vehicle asset measurements. The vehicle asset 100 processor may identify when one or more sensor readings fulfill certain criteria such that a defined event may be logged. The vehicle asset 100 processor may then log all accessible data related to that event. For one exemplary embodiment, in the case of a "rapid deceleration" event being identified through the values presented by an accelerometer, the vehicle asset 100's ending speed, location and time/date may also be logged. More specifically, the following vehicle asset 100 measurements, without limitation, may be monitored, processed, and/or logged:

Rapid acceleration ("hard acceleration").
Rapid deceleration ("hard deceleration").
High rate of lateral acceleration ("hard cornering").
Use of turn signal.
Wheel spin.
Vehicle skid.
Driving with parking brake on.
Driving with low tire pressure.
Excessive steering at high speed.
Following too close.
Turning without using turn signal.
Changing lane without using turn signal.

Furthermore, after the measurement and/or event is logged, the telematics module 25 of a vehicle asset 100 may be configured to send a message/content via the communications-network 15A, for example, to a specified IP address. The message may contain an identifier for the specific vehicle asset 100, the purpose of the message (e.g., timed observation, specified event) and the measurement data that was logged. The telematics module 25 may also be configured to receive messages over the communications-network 15A to affect the operation of the vehicle asset(s) 100. In one exemplary embodiment, the telematics module 25 may at least partially facilitate System 2000 requesting activation or disablement of the vehicle asset 100's starter motor and/or System 2000 requesting locking or unlocking of the vehicle asset's doors.

In the exemplary embodiments of vehicle asset 100 comprising LMU 2620, a message sent via user datagram protocol (UDP) from the telematics module of a vehicle asset (telematics module 25, for example) may comprise a proprietary format called LMU Direct. Moreover, a message sent to the telematics module of a vehicle asset (telematics module 25, for example) may travel through the communications-network 15A via SMS, for example. Those skilled in the art will appreciate that there are many different telematics modules available both commercially "off-the-shelf" and through custom manufacturers. The LMU 2620 is offered as a non-limiting example, and the present disclosure envisions utilizing equivalent devices, software, formats and protocols.

Furthermore, the vehicle assets 100 may also be equipped with sensors configured to confirm the identity of the actual driver and whether he/she is one of the named drivers/ subscribers on an account. In one exemplary embodiment, a Bluetooth low energy beacon 30 functioning in conjunction with the telematics module 25 may be placed in the front left corner of the vehicle asset 100's interior. The proximity 150 of an associated subscriber/driver PCD 114 may then be calculated using functionality built into the service's customer application 114 (described in greater detail herein) executing on PCD 114. Generally, each instance of the customer application 170 executing on a customer device 114 will measure its proximity 150 to the beacon 30 of the vehicle asset 100. This data may then be used to estimate which device 114 is closest to the driver's seat. This may provide evidence that the person associated with the device 114 closest to the driver seat is in fact the subscriber/named driver. In a different exemplary embodiment, the vehicle asset 100 may comprise alternative sensors such as a fingerprint sensor on the start button or a camera in the dashboard.

Integration service 103, listening and initial processing service 105, storage service 106, batch analytics and long-run decisioning service 107, short-run decisioning service 108, vendor/partner data and integration service 110, operations execution applications 111, and customer management applications 112 describe functionality provided by system level services that each run on either virtual or physical machines. In a preferred embodiment, the various services are instantiated on virtual machine instances in a virtual private cloud provided by a commercial cloud-computing provider. Communication between the various services may be achieved using selected formats, such as JSON, and network protocols, such as TCP or HTTP. Alternative exemplary embodiments may have the same or similar architecture hosted in a single tenant data center or a colocation data center.

Integration Service 103 of System 2000 may be associated with the initial reception and processing of message data packets transmitted from the vehicle asset fleet 101 via cellular network 102 and/or any other system component. The integration service 103 may function to execute a variety incoming data feeds. These data feeds may comprise vehicle telematics data, third party data sources 104, and feeds from the operations execution application(s) 111 and customer management application(s) 112.

Within the integration service 103, a message broker application may receive, log, queue and forward incoming data packets. The integration service 103 may comprise a protocol server configured to convert any received data feeds/packets to objects/services using a format such as JavaScript Object Notation (JSON). This integration module is usually a messaging broker, such as RabbitMQ™ brand open source message broker software available as of this writing, that can receive messages. These messages are held in a queue until they are processed by code that is listening to this queue. The processing code usually writes these messages to other system applications or system databases using a network protocol such as transmission control protocol (TCP) or hyptertext transmission protocol (HTTP). In one exemplary embodiment, the majority of data feeds/ packets executed by the integration service 103 may be forwarded to the listening and initial processing service 105.

More specifically, a number of message broker software packages may be available for the integration service 103 including Apache Kafka™, Apache ActiveMQ™, StormMQ™, and RabbitMQ™ brand open source software. A number of network application frameworks, such as Netty.io™, may also be available for the development of protocol server functions at the integration service 103.

Third party data sources 104 of System 2000 may comprise manufacturer's specifications for the vehicle assets 100 in the vehicle asset fleet 101, manufacturers' recall notices, mapping data, traffic data, weather data, etc. Third party data sources 104 may be made available through a variety of different protocols and interfaces. Appropriate technologies such as file transfer protocol software (FTP) and calls to application programming interfaces (APIs) may be applied to query these data sources. Moreover, depending on the specific software and hardware configuration of the system embodiment, the specific technology that may be used to access the third party data sources 104 may be custom built.

Furthermore, in one exemplary embodiment, the data garnered from the third party data sources 104 may be contextual data relevant to the determination of a specific Driver Score, driving behavior, projected demand, etc. Therefore, the types of third party data accessed by the system of the present disclosure, both historical and forecast, may comprise mapping, traffic, weather, events, etc.

Listening and initial processing service 105 of System 2000 may comprise a processing engine, with associated hardware and software, configured to process the data streams/packets received from integration service 103, for example. This process of reading the events and putting them in a more richly defined data structure is known as parsing and is implemented by understanding the specific format of the event. The raw telematics data is received in the form of UDP packets and the Listening and initial processing service 105 processes the packets to get the contents of the message. An example of a richly defined data structure is an object with fields like telematics device id, event timestamp, speed, latitude, longitude etc. with values filled out from processing the raw message. An example object could have values of 4044444321 for the telematics device id, 7 miles per hour for the speed and 33.8539685 as the latitude and −84.3216858 as the longitude. The object may also be saved into a database table with columns that correspond to the fields in the object. The listening and initial processing service 105 may also be configured to execute streaming processes or batch processes. Moreover, the listening and initial processing service 105 may utilize a stream processing technology framework such as Apache Spark™. Specific processing tasks may be coded in one of the supported languages such as Java, Scala or Python. The listening and initial processing engine service 105 may follow a reactive architecture and may be event-driven.

In one exemplary embodiment, the listening and initial processing service 105 having received data feeds/packets from the integration service 103 may determine and execute at least one or more of the following steps:

Assign the data for one or more initial processing steps before it is written to storage 106.

Write the data directly to storage 106.

Identify certain events that require urgent action such as a severe mechanical failure in a vehicle asset 100 (when applicable, notification may be sent via the System 2000 to the online decisioning engine 108, for example).

Storage 106 of System 2000 may comprise a set of databases that hold the output from listening and initial processing data 105 and the output of various batch processes and algorithms that are subsequently performed on any data. The storage 106 may comprise a combination of a distributed file system, such as a java-based file system that provides scalable and reliable data storage spanning large clusters of commodity servers (an HDFS system, for example), and an analytical database built to query that file system, such as HIVE™ or SHARK™ brand of analytical databases known as of this writing. The storage 106 may also comprise SQL databases such as Postgresql and MySQL.

Referring now to FIG. 1C, this figure provides a data architecture diagram 106 with the different data elements that are divided into six blocks 1605-1630 which correspond with the storage block 106 of FIG. 1B. Each block covers one exemplary aspect of the data. While FIG. 1C provides one exemplary embodiment of data architecture, one of ordinary skill in the art recognizes that other data architectures/data divisions/partitions are possible and are within the scope of this disclosure.

1605 Subscriber/driver/member data block group—This data block group 1605 may include data about subscribers of system 2000, the subscribers' accounts, and the drivers on those accounts.

1603 (Subscribers and drivers) data sub-block—In this sub-block 1603, the system 2000 stores information about the subscriber accounts and drivers. A subscriber account may have multiple drivers that are eligible to drive the vehicles. The data in this sub-block may address billing information, some demographic information and locations that the subscribers/drivers use to swap vehicles.

1609 (Swap Requests & Subscriber/driver Preferences) data sub-block—In this data sub-block 1609, the system 2000 may track vehicle swaps or flips. Specifically, subscribers/drivers may request swaps through an application on their portable computing device (such as on a phone, where clients may have operating systems such as iOS, Android etc.) or by directly messaging the system 2000. The data about subscribers' requests and any preferences for vehicles that they have established (such as preferred vehicle makes/brands, types etc.) may be stored in this data sub-block 1609.

1607 (Subscriber/Driver Scores) data sub-block—The system 2000 may score the subscribers/drivers based on different behavioral events when subscribers are using the vehicles 101 offered by the system 2000. This data may include, but is not limited to, interactions with the application running on a portable computing device 114, accidents/incidents when using the vehicles 101, the variety of vehicles 101 used by subscribers etc. The system 2000 uses all of this data to build a profile of the subscribers/drivers and assign them scores.

1612 (Billing & Payments) data sub-block—The system 2000 may also record payment and billing history. For processing payments it may use an external service like Stripe™. This sub-data block may also record metering history, which may include calculations that translate measurements of how a subscriber/driver uses the service (e.g., number of swaps in a time period, number of miles driven in a time period) and calculates a charge by applying certain rates (e.g., dollars per flip, dollars per mile); the sub-data block might retain a record of the input metrics, the rates applied and the resulting charges.

1610 (Subscriber/driver Vehicle Possessions) data block group—The data in this group 1610 may track data about the possession of different vehicles by the subscribers/drivers.

1617 (Significant Events) data sub-block—The system 2000 may track significant events that happened during the subscriber/driver's possession of the vehicle. This data may comprise events like the number of sudden accelerations per mile driven, sudden stops in which tires lock-up, or when an automatic braking system (ABS) is employed/activated, and any other significant events relating to vehicle safety that the system 2000 may take action on.

1624 (Trips & Usage Metrics) data sub-block—The system 2000 may record usage history of the vehicle 101 during a subscriber/driver possession. The system 2000 may calculate the number and duration of trips and other metrics such as total miles driven for a vehicle during a possession for a particular subscriber. Such data may be recorded in this data sub-block 1624.

1621 (Reported Incidents) data sub-block—Subscribers/drivers have the ability to report any incidents with the vehicles using the customer applications 170 running on their portable computing devices 114. The system 2000 may record resulting data such as date of incident, types and severity of damage, and images uploaded by the subscribers/drivers that may comprise photographs of damage to a vehicle 101. Such data may be recorded in this data sub-block 1621.

1627 (Vehicle Ratings) data sub-block—subscribers/drivers may also have the ability to rate the vehicle 101 that they are in possession of and provide feedback using their portable computing device 114. This data is used in future vehicle assignments for the subscriber/driver. Such data may be stored in this data sub-block 1627.

1615 (Vehicle Data) block group—This data block group 1615 may track data about the vehicles 101 in the fleet.

1629 (Vehicle classification data structure) data sub-block—The system 2000 may track data related to the vehicle fleet 101 using a hierarchical classification structure based on make, model, year, trim and other attributes. Such data may be stored in this data sub-block 1629.

1637 (Maintenance & Repair Records) data sub-block—The system 2000 may save maintenance and repair records of the vehicles 101. It may also designate outages so that the vehicle 101 is not assigned to any of the subscribers/drivers during an outage. The system 2000 may employ triggers to notify of upcoming service events for each vehicle 101.

1633 (Connected Car Integration) data sub-block—This data sub-block 1633 may track the type of hardware device, how the device was installed and configured and the device identification number for the telematics module 25 installed in each vehicle asset 101. In an exemplary embodiment where the hardware and software built into the vehicle asset 101 by the vehicle manufacturer (such as OnStar™ from GM™) is used to collect and upload telematics data, the service name, the access keys and the authentication codes to access the third party hardware and software for each vehicle asset 100 would be stored in this data sub-block 1633. The system 2000 may also enable the subscriber/driver to lock and unlock vehicles by an input to the Customer Application 170 that leads to signals passed through Customer Management Apps. 112, Operations Execution Apps 111 in order to transmit a command to the telematics module 25 and/or telematics software built into the vehicle asset 101 that commands the vehicle to lock or unlock; the rights of each subscriber/driver to lock or unlock a given vehicle in the present moment will be stored in Operations Execution Apps 111 and a history of those access rights will be stored in this data sub-block 1633.

1639 (Vehicle Attributes) data sub-block—The system 2000 may also save features of the vehicles 101 such as Bluetooth audio, backup cameras, side view cameras, so that it can assign the vehicle 101 to each subscriber/driver based on their preferences. Such data may be stored in this data sub-block 1639.

1625 (Staff Data) block group—This block group may track data relating to operations of the vehicle subscription service provided by the system 2000.

1663 (Staff Scheduling) data sub-block—This data sub-block may track the working schedule for the operations staff (also known as concierges) who work to support the different swaps/flip requests of subscribers/drivers. This operation team may also manage the vehicle fleet 101. The system 2000 may save the data about the availability and scheduling of the staff based on factors like projected swap demand.

1673 (Subscriber/driver Interactions) data sub-block—The data in this sub-block 1673 may track the staff team who interacts with the subscribers/drivers in various formats like emails, instant messaging, SMS messaging, phone calls etc. The metadata (e.g., type of message, sender, recipient, location sent from, device sent from) from those interactions is saved as is the content of digital messages.

1667 (Workflow Management) data sub-block—Executing a vehicle swap/flip involves multiple steps such as cleaning the vehicle 101, running maintenance checks and delivering the vehicle 101 that could potentially be divided among multiple people. The system 2000 may defines workflows for the swap/flip process and other processes in this data sub-block 1667.

1677 (Fleet Forecasting & Vehicle Assignment) data sub-block—the system 2000 may run predictive algorithms to determine fleet availability on a future data and match it with the subscriber/driver swap requests to assign a vehicle 101 to the subscriber/driver. Such data is stored in this sub-block 1677.

What is important to note about the four blocks defined above (1605,1610,1615 and 1625) is that the data contained there could also be partitioned based on the operating market/geography for the subscription service. For example, for an urban market, such as the city of Atlanta in the state of Georgia, the subscription service provided by system 2000 may have a set of subscribers/drivers that can be assigned to a fleet 101 defined for the market by the staff servicing that particular market. This also indirectly ties all the subscriber/driver vehicle possession data to a specific market as well.

1620 (Real-time Data Stream) data block group—All the data relating to real-time data streams associated with each vehicle 101 may be stored in this data block group 1620.

1643 (Telematics Data) data sub-block—The system 2000 may constantly receive telematics data from the telematics modules 25 fitted in vehicle assets 101. In another exemplary embodiment, the system 2000 may also use hardware and software built into each vehicle asset 101 by the vehicle manufacturer (such as OnStar™ from GM™) to collect and upload this data. Such data may be stored in this data sub-block 1643.

1653 (Weather Data) data sub-block—The system 2000 may consume a continuous stream of weather data using a data provider such as The Weather Channel™ brand of weather data available from the Internet as of this writing. Weather data may be stored by system 2000 in this data sub-block 1653.

1647 (Contextual Data) data sub-block—The system 2000 may track mapping data (type of road, use zoning, population density, average household income, average age of buildings, etc.), traffic, and data on local events (e.g., timing and nature of events such as professional sports games or musical concerts). Both historical data and forecasts may be obtained. This data may be sourced from APIs offered by third parties such as GOOGLE MAPS™, GOOGLE ROADS™ and TICKETMASTER™ brand event data available as of this writing from the Internet. Such data may be stored in this data sub-block 1647.

1657 (Usage Pattern Data) data sub-block—From different telematics data points taken from devices 25 on each vehicle and using contextual and weather data from data sub-blocks 1653 and 1647, the system 2000 may identify common patterns of driving behavior by using techniques such as time series analysis, etc. where it was sent, a message category and the parameter values for that message category. Such data may be stored in this data sub-block 1657.

1630 (Partner Data Feed) data block group—All the data that the System 2000 may obtain from third party vendors may be stored within this data block group 1630.

1683 (Vehicle Wholesale Auction Data) data sub-block—Data from partners like Manheim™ comprising a record of transactions at wholesale vehicle auctions including auction location, date, vehicles offered for sale, the attributes of those vehicles, whether sold and if sold the price realized may be stored in this data sub-block 1683.

1693 (Driver Risk Assessment Data) data sub-block—Data from Motor Vehicle Records, such as, but not limited to, speeding tickets, tickets issued for accidents, etc. that helps the system 2000 determine the risk associated with a driver using the subscription service supported by system 2000 may be stored in this data sub-block 1693.

1687 (Manufacturer Data) data sub-block—Data from the vehicle manufacturers including vehicle specifications and features may be stored in this sub-block. Data on model recalls that may be obtained from Manufacturers or from the US government's National Highway Traffic Safety Administration (NHTSA), including the safercar.gov website may be stored in this sub-block 1687.

1697 (Geo location & Vicinity Data) data sub-block—The system 2000 may make use of third-party vendor data to get vicinity information for some of the locations that the vehicles 101 drive through. A potential third-party as of this writing is FourSquare™ brand of vicinity information.

Referring again briefly back to FIG. 1B, the System 2000 may perform some activities on hourly, daily or weekly schedules and these activities may be performed by the batch analytics and decisioning service block 107 of FIG. 1B. The batch analytics and long-run decisioning service 107 of System 2000 may comprise a processing engine, with associated hardware and software, configured to iteratively aggregate data and to build statistical models that are written back to the storage 106. The output of batch analytics and long-run decisioning service 107 may be used for further decisioning, and for optimization algorithms. The optimization algorithm may apply business logic to create plans and procedures that are again written back to the storage 106.

In one exemplary embodiment, the batch algorithms performed by the batch analytics and long-run decisioning service 107 may be on a daily or weekly schedule. The output of batch analytics and long-run decisioning service 107 may also be used by the short-run decisioning service 108 Moreover, data aggregation and higher-level processing executed by the batch analytics and long-run decisioning service 107 may be performed via a jobs framework like SPARK™ or HADOOP™ brand open source software known as of this writing. Statistical modeling, decisioning and optimization jobs may be executed through code written for a Java Virtual Machine (JVM) or even in a directly executed language such as C or C++. As noted above, other computer programming languages are possible and are within the scope of this disclosure.

The System 2000 may perform some activities, of typical duration from less than a second to a few seconds, when triggered by events that necessitate a decision on whether an action needs to be taken. Examples of such events might include a customer submitting a request to swap vehicles, a staff member notifying the system of a delay and the receipt of a message from a telematics module that a vehicle is displaying a diagnostic trouble code. The activities that thus triggered are performed by the short-run decisioning service 108. The short-run decisioning service 108 of System 2000 may comprise a processing engine, with associated hardware and software, configured to manage core routines (described in greater detail herein). The short-run decisioning service 108 may execute the core routines on a scheduled basis as well as in response to events pertaining to vehicle asset fleet 101 demand, staff operations, customers swap requests, etc. The short-run decisioning service 108 may be configured to call any necessary parameters for the core routines from the storage 106. The core routines may be using code written for a Java Virtual Machine (JVM) and/or a scripting language such as, but not limited to, Javascript.

In one exemplary embodiment, the allocation of a vehicle asset 100 in vehicle asset fleet 101 may be executed at the short-run decisioning service 108 using parameters held in the storage 106. The parameters used by the short-run decisioning service 108 may have been previously created under a batch process at the batch analytics and long-run decisioning service 108. When necessary, highly constrained optimization algorithms may be executed at the short-run decisioning service 108 using heuristics. In this way, the processing time of the short-run decisioning service 108 may be cut to just a few seconds.

The short-run decisioning service 108 of System 2000 can make calls to third party systems to request and receive vendor/partner data 110. One example of such data might be Motor Vehicle Records for a prospective or existing customer, which are available for purchase from companies such as LexisNexis Risk Solutions or Verrisk. Another example might be data on the availability of vehicle assets that is extracted from the internal systems of partners who have agreed to supply vehicles to the service on a temporary basis. Third party data sources may be made available through a variety of different protocols and interfaces. Appropriate technologies such as file transfer protocol software (FTP) and calls to application programming interfaces (APIs) may be applied to query these data sources. Moreover, depending on the specific software and hardware configuration of the system embodiment, the specific technology that may be used to access the third party data sources 104 may be custom built.

Furthermore, the vendor/partner data and integrations service 110 may function to execute a variety incoming data feeds. Within the vendor/partner data and integrations service 110, a message broker application may receive, log, queue and forward incoming data packets. In one exemplary embodiment, the majority of data feeds/packets executed by the vendor/partner data and integrations service 110 may be forwarded to the short-run decisioning service 108.

Operations execution applications service 111 of System 2000 may comprise software application program services, and any related content, configured to manage various aspects of the subscription vehicle access service. The operations execution applications 111 may manage the following non-limiting aspects:

Vehicle schedule.

Fleet asset management.

Staff scheduling and swap logistics (including tracking staff [actual versus planned], location, and activities).

Vehicle asset 100 remote access control (e.g., remote locking/unlocking), immobilization and configuration.

In one exemplary embodiment, the operations execution applications 111 may provide the short-run decisioning service 108 with output, and receive instructions back. The content/services of operations execution applications 111 may be written in an object-oriented language such as Java, but other computer programming languages are possible and are within the scope of this disclosure as discussed above.

Customer management applications service 112 of System 2000 may comprise software application program services, and any related content, configured to manage system interactions with system customers/subscribers. The customer management applications service 112 may manage the following non-limiting aspects:

Customer account management.

Customer contact management.

Possession/custodianship scheduling.

Billing and payments.

Help desk.

In one exemplary embodiment, the customer management applications 112 may provide the short-run decisioning service 108 with output, and receive instructions back. The content/services of customer management applications 112 may be written in an object-oriented language such as Java, but other computer programming languages are possible and are within the scope of this disclosure.

Staff PCD 113 may execute Staff Applications 160 and Customer PCD 114 may execute Customer Applications 170. Staff Applications 160 and Customer Applications 170 may comprise software application program services, and any related content/data, configured to allow staff and customers to interact with the System 2000. The Staff Applications 160 and the Customer Applications 170 may be written as web applications in HTML5 or in native code for the personal computing device in question (e.g., Xcode for iOS applications). The Staff Applications 160 and the Customer Applications 170 may be deployed to mobile and PC clients via the communications network 15A. The Staff Applications 160 may present the service's staff with a sequence of tasks to be performed, including without limitation preparing vehicles to be swapped, executing swaps and performing maintenance or repair actions. The Staff Applications 160 may further provide information to be used in the execution of those tasks including without limitation lists of specific preparation tasks to be performed, projected timings for tasks, suggested routes for tasks involving driving and special instructions for performing swaps with individual customers. The Staff Applications 160 may record the completion of tasks and the time when each task was completed. The information presented on Staff Applications 160 may be requested through communications network 15A3 from Operations Execution Apps 111 which contains software to coordinate and optimize the sequencing and execution of all tasks being performed by staff on behalf of the service.

Figure 2:
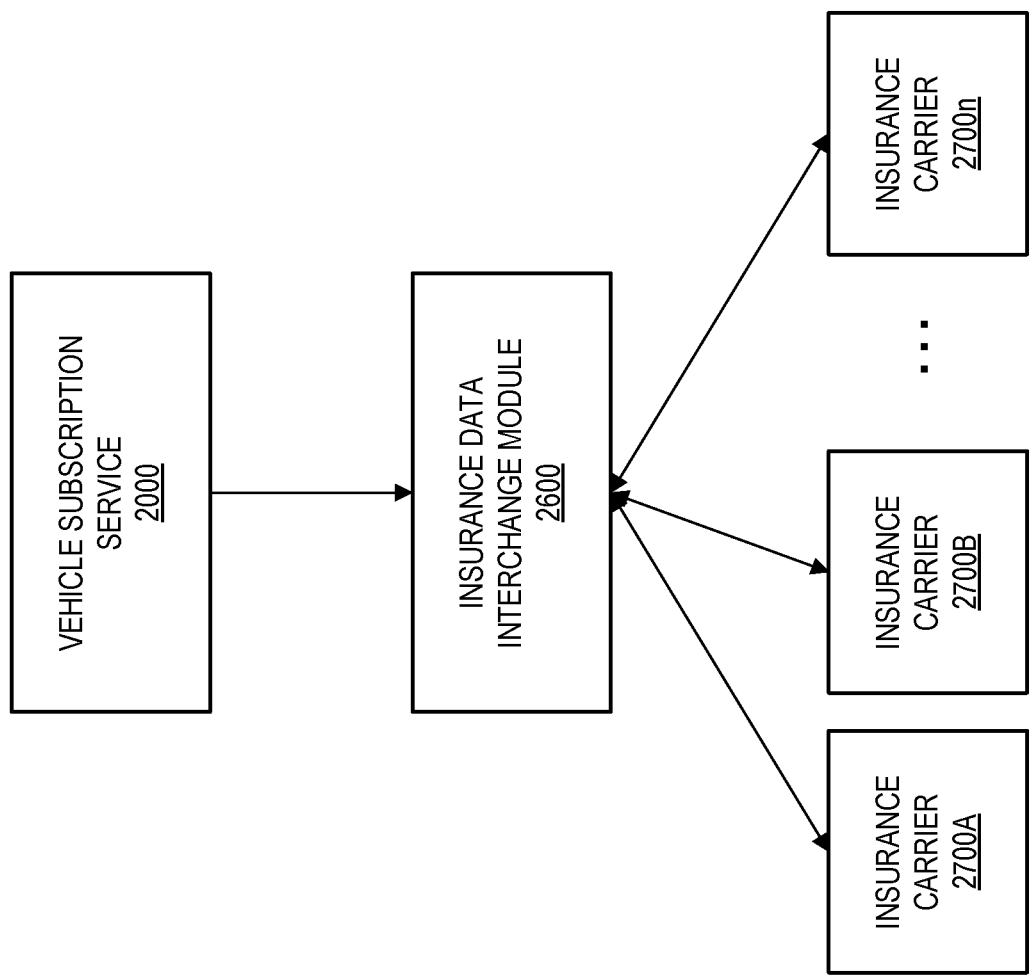
FIG. 2 is a high level block diagram of the system of FIG. 1 expanded to include an insurance data interchange module for providing dynamic insurance coverage in a subscription vehicle service environment.

FIG. 2 is a high level block diagram of the system of FIG. 1 expanded to include an insurance data interchange module 2600 for providing dynamic insurance coverage in a subscription vehicle service environment. The vehicle subscription service 2000, and its various aspects and functionalities, are well described in the parent application to the present disclosure as well as relative to FIGS. 1B and 1C above. Embodiments of the solution described in the present disclosure may further comprise an insurance data interchange ("IDI") module 2600 that, although depicted as a separate element in the FIG. 2 illustration, may be a part of the vehicle subscription service 2000. Moreover, it is envisioned that any one or more of the functions described herein within the context of the IDI module 2600 may be associated with an aspect of the vehicle subscription service 2000 without departing from the scope of the disclosure.

As can be generally understood from the FIG. 2 illustration, the IDI module 2600 is an extension of the vehicle subscription service 2000 positioned as an interface to the service 2000 with a pool of insurance carriers 2700. In this way, the IDI module 2600 may serve to aggregate and provide useful data from the service 2000 in relation to DTV combinations for the purpose of providing to the carriers 2700. Using the data, the carriers 2700 may work through the IDI module 2600 interface to dynamically underwrite vehicle assets, clients based on active DTV pairings, risk pools of clients and/or DTV pairings, etc.

Figure 3A:
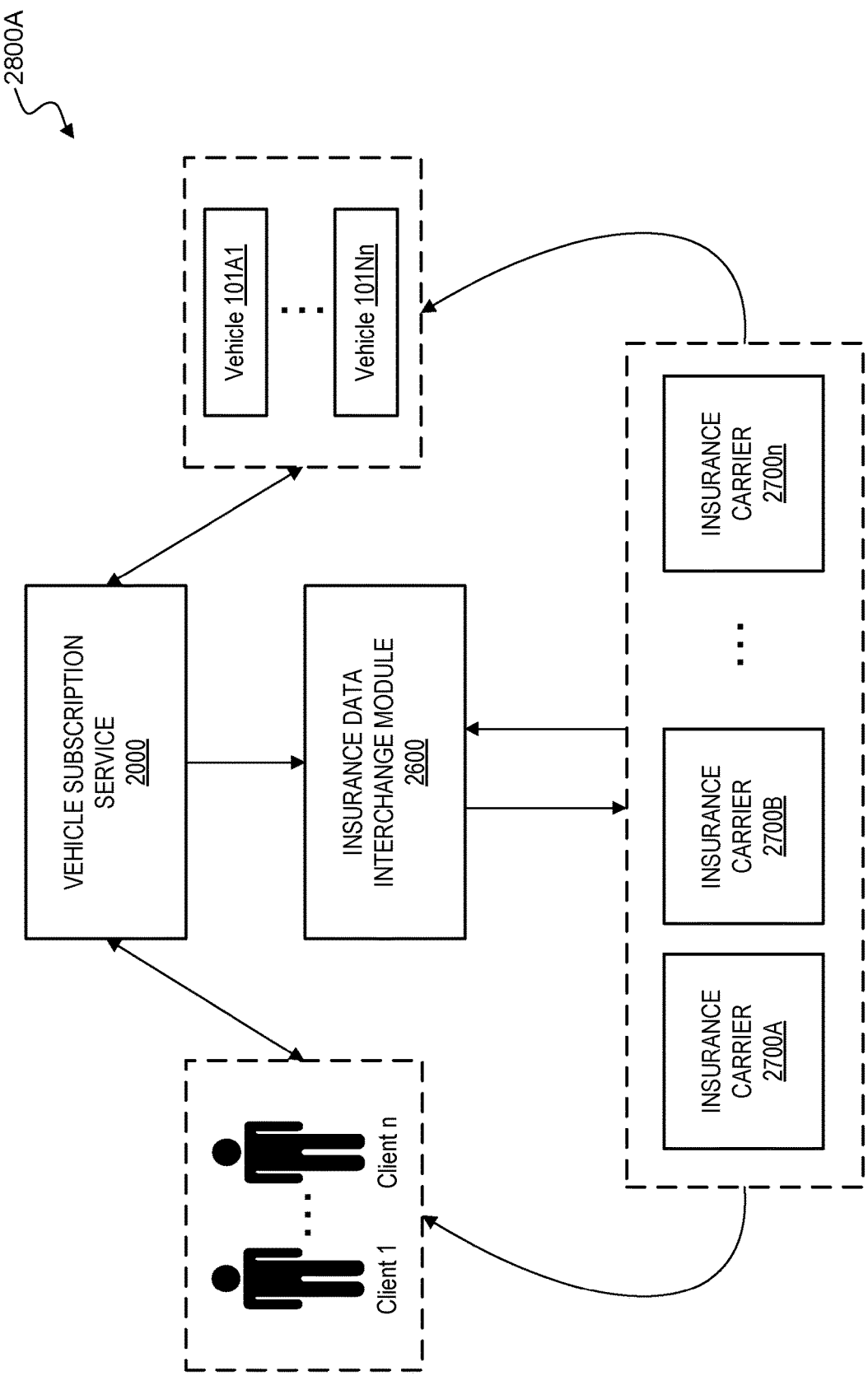
FIG. 3A is a functional block diagram illustrating an exemplary system according to the proposed solution for dynamically insuring driver-to-vehicle combinations in a subscription vehicle service environment.

FIG. 3A is a functional block diagram illustrating an exemplary system 2800A according to the proposed solution for dynamically insuring driver-to-vehicle combinations in a subscription vehicle service 2000. As will become clearer from the description that follows, the IDI module 2600 may serve as an insurance registry for dynamically matching vehicle asset 101 usage in DTV pairings with insurance coverage optimized in view of the active pairings. The IDI module 2600 serves as the source of record to the insurance carriers 2700 on vehicle asset 101 usage such that the carriers 2700 may efficiently, and dynamically, underwrite the vehicle assets 101 and/or the clients paired with the vehicle assets 101.

As can be seen in the FIG. 3A illustration, a pool of insurance carriers 2700 are in communication with the vehicle subscription service 2000 via the insurance data interchange ("IDI") module 2600. As clients to the service 2000 engage in various combinations with vehicles 101 according to their options within the service 2000, the service 2000 leverages various data inputs previously described (such as telematics, client inputs via PCDs, service personnel observations, etc.) to collect data elements in association with DTV combinations. The data elements may be provided to the IDI module 2600 for the purpose of packaging and provision to the insurance carriers 2700. Using the data elements, in some embodiments of the solution the insurance carriers 2700 may quote and/or continue to provide coverage for an active, or imminently active, DTV combination. Notably, it is envisioned that for continued coverage the provider may maintain pricing and coverage for an existing policy or, depending on the nature of the imminently active DTV combination, may adjust the premium, coverage, etc. of the existing policy. In these ways, the insurance coverage provided to a client of the service 2000 may be dynamically adjusted based on a change to a DTV combination that includes the client. Similarly, the insurance coverage provided to the service 2000, as owner of the vehicle assets 101, may be dynamically adjusted based on the active status of a given vehicle asset 101 in a DTV pairing.

For example, suppose a client 1 is paired with a vehicle asset 101A1 and schedules a change in the DTV pairing such that vehicle 101A1 is exchanged for vehicle 101B1. As previously described, the system 2000 may be able to determine the nearly exact time that client 1 relinquishes control of vehicle asset 101A1 and takes control of vehicle asset 101B1, thereby changing the active DTV pairing for client 1. The system 2000 may also be able to aggregate information regarding the client's intended use of vehicle asset 101B1, a use that may be very different than the client's use of vehicle asset 101A1. The system 2000 may also be able to aggregate driving patterns, driving habits, likely driving conditions, and so forth associated with client 1. Even further, the system 2000 may be able to aggregate data indicative of the condition and value of the vehicle asset 101B1. Notably, and as one of ordinary skill in the art of insurance underwriting will recognize, all such factors, or any combination of such factors, may be useful to an insurance carrier for accurately assessing the risk associated with the coverage of the client in the specific DTV pairing that includes the vehicle asset 101B1. Similarly, all such factors, or any combination of such factors, may be useful to an insurance carrier for accurately assessing the risk associated with the coverage of the vehicle asset 101B1 itself when it is associated with a specific DTV pairing that includes the client 1.

The IDI module 2600 may be configured to receive the aggregated data elements from the service 2000 and package the data such that it is useful for the various carriers 2700. A timestamp associated with the client 1 "flip" of vehicle 101A1 to vehicle 101B1, thereby modifying the active DTV pairing for that client, may trigger a deactivation of insurance coverage for the original DTV pairing and an activation of a new insurance coverage provided by one of the carriers 2700 in association with the new DTV pairing. In this way, it is an advantage of certain embodiments of the solution that insurance coverage may be adjusted and optimized each time a client is paired with a vehicle asset in the fleet. It is further envisioned that embodiments of the solution may provide means for the particular insurance carrier providing coverage to a given client to dynamically generate digital documents for the verification of insurance and insurance card, as may be required by law or regulation. The digital documents may be provided to the client via the IDI module 2600 such that the updated verification of insurance and insurance card may be accessible immediately for the driver to present via their PCD.

At the very highest level, embodiments of the solution provide carriers 2700 with a means to leverage the packaged data for underwriting DTV combinations, approving coverage of DTV combinations and issuing policies to clients of a SVS in view of DTV combinations. Notably, it is envisioned that the IDI module 2600 may provide such means in different configurations depending on embodiment. For example, for a new DTV combination, multiple carriers 2700 may submit quotations for underwriting the particular DTV combination such that the SVS client is able to select a preferred policy and pay the associated premium, thereby enacting the insurance coverage for the DTV combination. A variation of such an embodiment may be configured such that the IDI module 2600 automatically selects the most advantageous quotation according to one or more predetermined rules (e.g., premium price, scope of minimum coverage, etc.) and auto-debits a stored value account associated with the client (e.g., a bank account).

As another example, an embodiment of the solution may provide for an SVS client to enter into a dynamic policy with a given carrier 2700 such that the client is obligated to pay whatever premium is generated as a result of the client's active DTV combination and/or other dynamic factors that affect the premium. For example, a dynamic policy according to this type of exemplary embodiment may generate a weekly premium that fluctuates in view of weather, driving conditions, driving behavior (such as may be gathered via telematics), driver, etc. even though the particular vehicle asset 101 remains the same. Similarly, a dynamic policy according to this type of exemplary embodiment may generate premiums that vary depending on the particular DTV combination active with the client's account, even though the insurance carrier 2700 remains unchanged.

As yet another example, an embodiment of the solution may provide for an SVS client to enter into a dynamic policy such that the client purchases an insurance subscription—the client agrees to pay the selected carrier 2700, via the IDI module 2600, a fixed rate for the provision of insurance coverage while using the SVS. In return for the fixed payment, the carrier 2700 issues policies dynamically for each DTV. In such an embodiment, it is envisioned that the insurance subscription may be limited according to certain constraints such as, but not limited to, the type of vehicle (e.g., no Ferraris!) or drivers on the account eligible for coverage (e.g., no adding your 18 year old boy). By using the constraints on coverage, a carrier 2700 may limit the amount of risk in view of the fixed rate premium. In operation, it is envisioned that such an embodiment may provide for the carrier 2700 to consider and approve each DTV combination based on a data package delivered by the IDI module 2600. If the DTV combination is within the predetermined constraints, then the DTV combination would be approved for coverage, thereby clearing the SVS to facilitate the new DTV combination with the client. Moreover, it is envisioned that the result of evaluating a new DTV combination in view of a fixed rate dynamic insurance policy may be, but is not limited to being, i) approval to create the policy, ii) denial of coverage for a proposed DTV, or iii) approval of coverage for the proposed DTV contingent on an additional premium payment or adder.

Figure 3B:
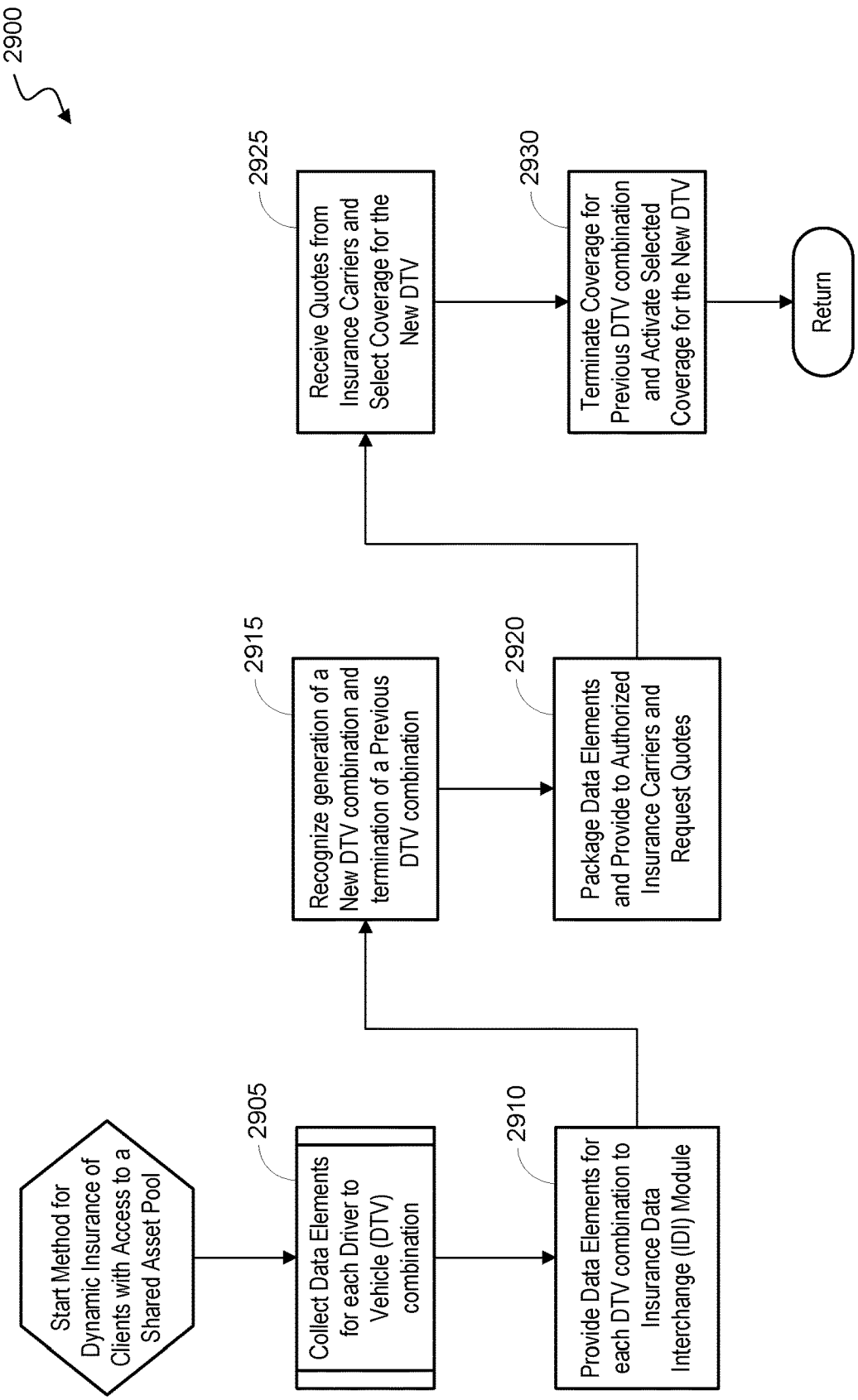
FIG. 3B is a flowchart illustrating a method for dynamically insuring driver-to-vehicle combinations in a subscription vehicle service environment using a multiple carrier approach.

FIG. 3B is a flowchart illustrating a method 2900 for dynamically insuring driver-to-vehicle combinations in a subscription vehicle service environment using a multiple carrier approach. Beginning at process block 2905, the service 2000 may collect data elements for each driver-to-vehicle ("DTV") combination. As previously described, the collected data elements may include, but are not limited to including, timestamp data associated with a vehicle asset "flip," driving history of the client, driving patterns, driving habits, vehicle asset condition, intended use of the vehicle, intended duration of DTV combination, vehicle asset value, etc.

Next, at block 2910 the collected data elements may be provided to the IDI module 2600 so that it may be leveraged for the purpose of dynamically adjusting insurance coverage in response to changes in active DTV pairings and/or data associated with active DTV pairings. At block 2915, if a new DTV pairing is generated (or an active DTV pairing is changed), the method 2900 recognizes that a present DTV pairing is terminated. The change of a DTV pairing from a present DTV pairing to a new DTV pairing triggers the method 2900 at block 2920 to package the various data elements according to the preferences or needs of the insurance carriers 2700 and provide to those carriers 2700 authorized to insure the particular client and/or vehicle asset 101, as the case may be. Notably, although the exemplary method 2900 is being described within the context of a present DTV pairing that is being modified to a new DTV pairing, it will be understood that a variation of the exemplary method 2900 may be applied within the context of a first DTV pairing, such as when a client first subscribes to the service 2000. Additionally, although the exemplary method 2900 is being described within the context of a plurality of insurance carriers 2700 that may be "quoting" to cover the new DTV pairing, it will be understood that the exemplary method 2900 envisions adjustment of an insurance coverage by a single authorized carrier 2700 based on a change of the active DTV pairing (exemplary embodiments described relative to FIGS. 3C and 3D).

Returning to the method 2900, at block 2925 the insurance carriers 2700 return quotes the IDI module 2600 for coverage of the client and/or the vehicle asset 101 in view of the new DTV pairing. Notably, and as previously envisioned, the "quotes" received at block 2925 may also be an adjustment of an existing insurance policy provided by a single authorized carrier 2700, the policy being adjusted in view of the change to the DTV pairing. The method 2900 continues to block 2930 and the new policy is activated (or an existing policy adjusted); if an old policy exists in association with the previous DTV pairing then it may be terminated simultaneously with activation of the new policy. In this way, embodiments of the solution may efficiently optimize insurance coverage in view of active DTV pairings within a subscription vehicle service.

Figure 3C:
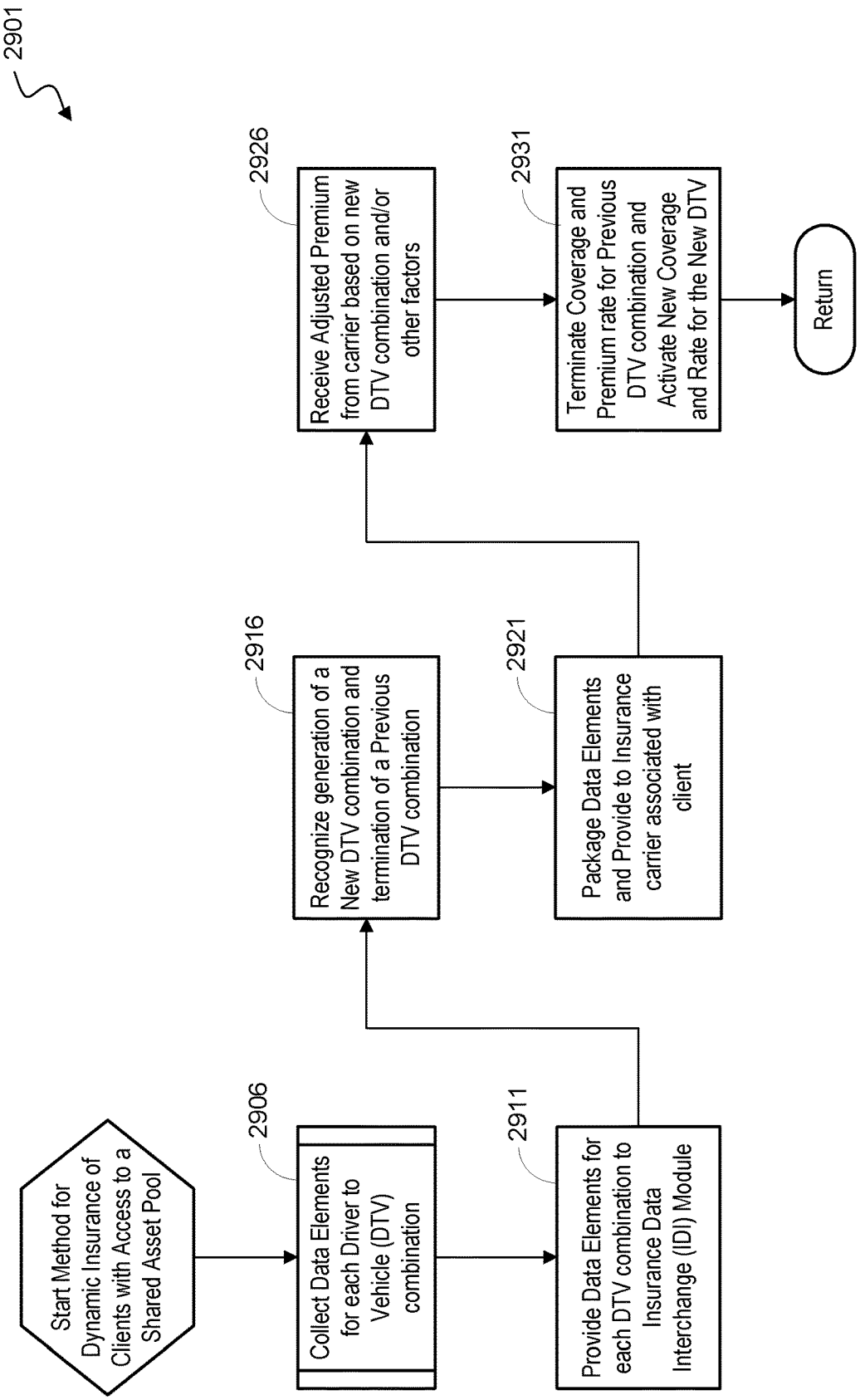
FIG. 3C is a flowchart illustrating a method for dynamically insuring driver-to-vehicle combinations in a subscription vehicle service environment using a dynamic premium approach.

FIG. 3C is a flowchart illustrating a method 2901 for dynamically insuring driver-to-vehicle combinations in a subscription vehicle service environment using a dynamic premium approach. Beginning at process block 2906, the service 2000 may collect data elements for each driver-to-vehicle ("DTV") combination. As previously described, the collected data elements may include, but are not limited to including, timestamp data associated with a vehicle asset "flip," driving history of the client, driving patterns, driving habits, vehicle asset condition, intended use of the vehicle, intended duration of DTV combination, vehicle asset value, etc.

Next, at block 2911 the collected data elements may be provided to the IDI module 2600 so that it may be leveraged for the purpose of dynamically adjusting insurance coverage/premium in response to changes in active DTV pairings and/or data associated with active DTV pairings. At block 2916, if a new DTV pairing is generated (or an active DTV pairing is changed), the method 2901 recognizes that a present DTV pairing is terminated. The change of a DTV pairing from a present DTV pairing to a new DTV pairing triggers the method 2901 at block 2921 to package the various data elements according to the preferences or needs of the insurance carrier 2700 associated with the SVS client and provide to that carrier 2700 the particular new DTV combination. Notably, although the exemplary method 2901 is being described within the context of a present DTV pairing that is being modified to a new DTV pairing, it will be understood that a variation of the exemplary method 2901 may be applied within the context of a first DTV pairing, such as when a client first subscribes to the service 2000 and selects a carrier 2700 for provision of a dynamic premium embodiment.

Returning to the method 2901, at block 2926 the insurance carrier 2700 associated with the client may return an adjusted premium amount the IDI module 2600 for continued coverage of the client in view of the new DTV pairing and/or other factors affecting an ongoing risk assessment. The method 2901 continues to block 2931 and the new premium is activated (or an existing premium adjusted); conditions of coverage in association with the previous DTV pairing may be adjusted for the new DTV pairing simultaneously with activation of the new premium. It is envisioned that embodiments of the solution may be configured such that the IDI module 2600 auto-debits a stored value account, such as a bank account, associated with the client for the new premium and according to a determined schedule. In this way, embodiments of the solution may efficiently optimize insurance coverage in view of active DTV pairings within a subscription vehicle service.

Figure 3D:
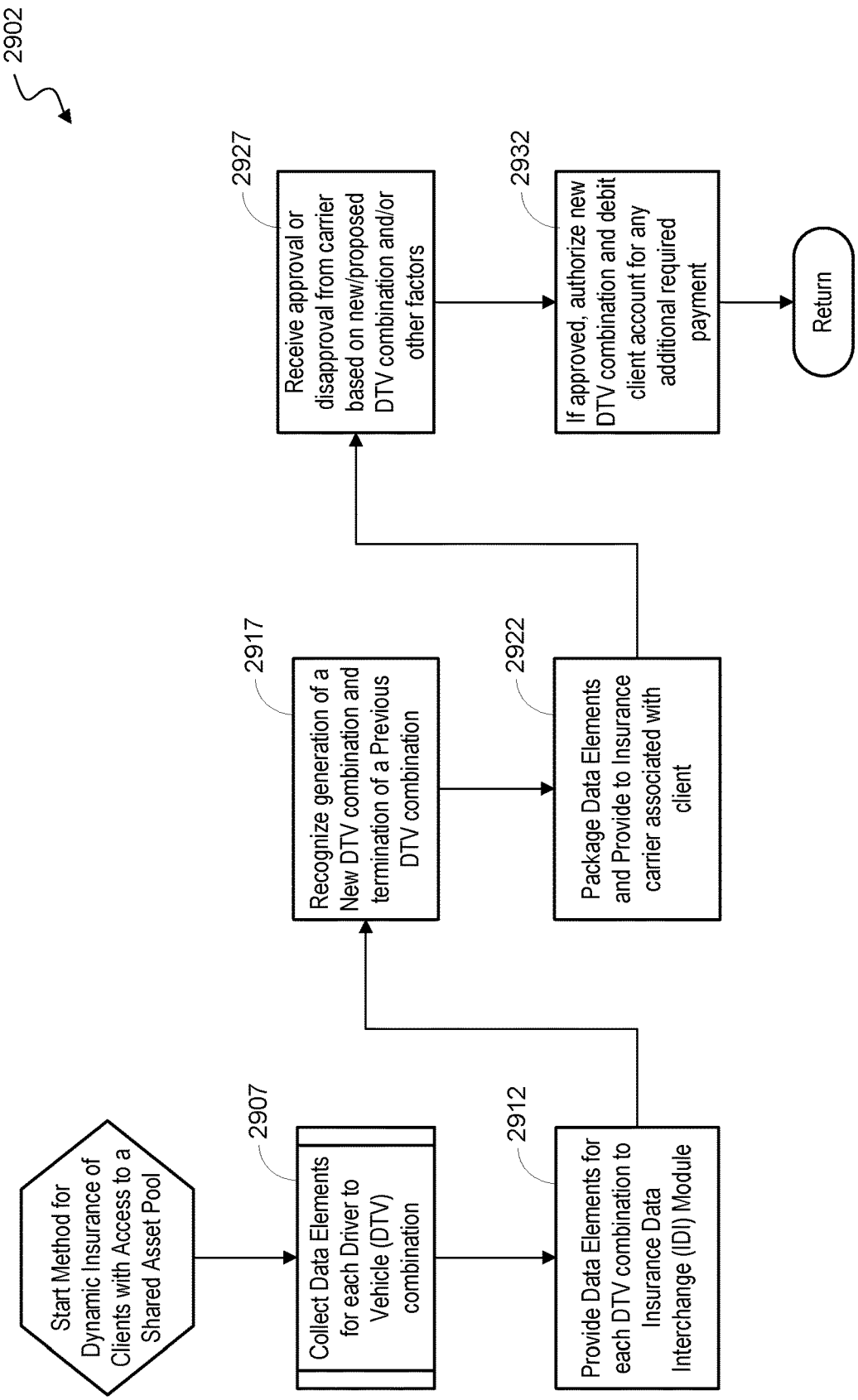
FIG. 3D is a flowchart illustrating a method for dynamically insuring driver-to-vehicle combinations in a subscription vehicle service environment using a fixed premium approach.

FIG. 3D is a flowchart illustrating a method 2902 for dynamically insuring driver-to-vehicle combinations in a subscription vehicle service environment using a fixed premium approach. Beginning at process block 2907, the service 2000 may collect data elements for each driver-to-vehicle ("DTV") combination. As previously described, the collected data elements may include, but are not limited to including, timestamp data associated with a vehicle asset "flip," driving history of the client, driving patterns, driving habits, vehicle asset condition, intended use of the vehicle, intended duration of DTV combination, vehicle asset value, etc.

Next, at block 2912 the collected data elements may be provided to the DI module 2600 so that it may be leveraged for the purpose of dynamically adjusting insurance coverage/premium and/or authorizing DTV changes in response to requests for changes in active DTV pairings and/or data associated with active DTV pairings. At block 2917, if a new DTV pairing is generated (or a change to an active DTV pairing is proposed), the method 2902 recognizes that a present DTV pairing may be terminated. The proposed change of a DTV pairing from a present DTV pairing to a new DTV pairing triggers the method 2902 at block 2922 to package the various data elements according to the preferences or needs of the insurance carrier 2700 associated with the SVS client and provide to that carrier 2700 the proposed new DTV combination. Notably, although the exemplary method 2902 is being described within the context of a present DTV pairing that is being modified to a new DTV pairing, it will be understood that a variation of the exemplary method 2902 may be applied within the context of a first DTV pairing, such as when a client first subscribes to the service 2000 and selects a carrier 2700 for provision of a fixed premium embodiment.

Returning to the method 2902, at block 2927 the insurance carrier 2700 associated with the client may return an approval or disapproval to the IDI module 2600 for continued coverage of the client in view of the new DTV pairing and/or other factors affecting an ongoing risk assessment. The method 2902 continues to block 2932 and the new DTV combination is approved for coverage per the fixed premium policy (or disapproved such that the client would not be covered for the proposed DTV combination under the existing fixed premium policy). Moreover, at block 2932 the exemplary method 2902 may provide conditional approval of the proposed DTV combination dependent upon, for example, an increased premium. It is envisioned that embodiments of the solution may be configured such that the IDI module 2600 auto-debits a stored value account, such as a bank account, associated with the client for the fixed premium and/or an additional premium and according to a determined schedule. In this way, embodiments of the solution may efficiently optimize insurance coverage in view of active DTV pairings within a subscription vehicle service.

Figure 4A:
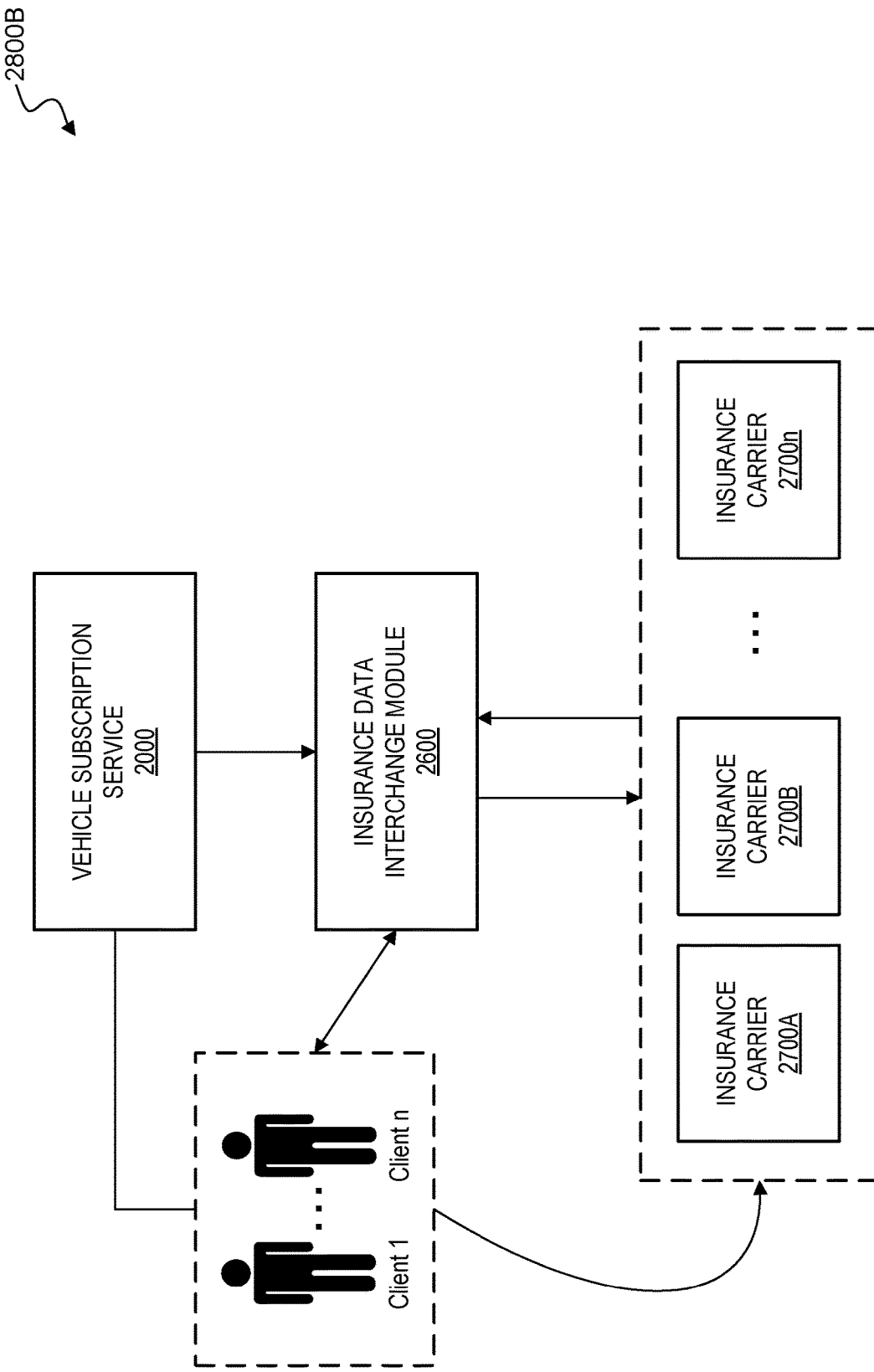
FIG. 4A is a functional block diagram illustrating an exemplary system according to the proposed solution for soliciting insurance quotations for clients of a subscription vehicle service.

FIG. 4A is a functional block diagram illustrating an exemplary system 2800B according to the proposed solution for soliciting insurance quotations for clients of a subscription vehicle service 2000. As will become clearer from the description that follows, the IDI module 2600 may serve as an insurance brokerage interface for soliciting new insurance quotes from authorized carriers 2700. In furtherance of such functionality, the IDI module 2600 may be configured to anonymize data and provide it to various insurance carriers 2700. It is envisioned that clients of the service 2000 may engage in the service for a certain period of time that is adequate for aggregation of useful data (driving habits, patterns, etc.) and then leverage the embodiment to solicit quotations from the carriers 2700 based on an anonymized package of the useful data. It is further envisioned that the carriers 2700 may refer existing customers of the carrier to the service 2000 for the purpose of collecting and aggregating useful data for the carrier's benefit in providing coverage to their customer.

As can be seen in the FIG. 4A illustration, a pool of insurance carriers 2700 are in communication with the vehicle subscription service 2000 via the insurance data interchange ("IDI") module 2600. As clients to the service 2000 engage in various combinations with vehicles 101 according to their options within the service 2000, the service 2000 leverages various data inputs previously described (such as telematics, client inputs via PCDs, service personnel observations, etc.) to collect data elements in association with DTV combinations. The data elements may be provided to the IDI module 2600 for the purpose of packaging and provision to the insurance carriers 2700 at the request of a client. Using the data elements, the insurance carriers 2700 may respond to a client request with a quote for insurance coverage. In this way, the insurance coverage provided to a client of the service 2000 may be dynamically adjusted based on a client's historical use of the service 2000 and at the request of the client. In this way, it is an advantage of embodiments of the solution that insurance coverage may be adjusted and optimized each time a client triggers a quotation solicitation.

Figure 4B:
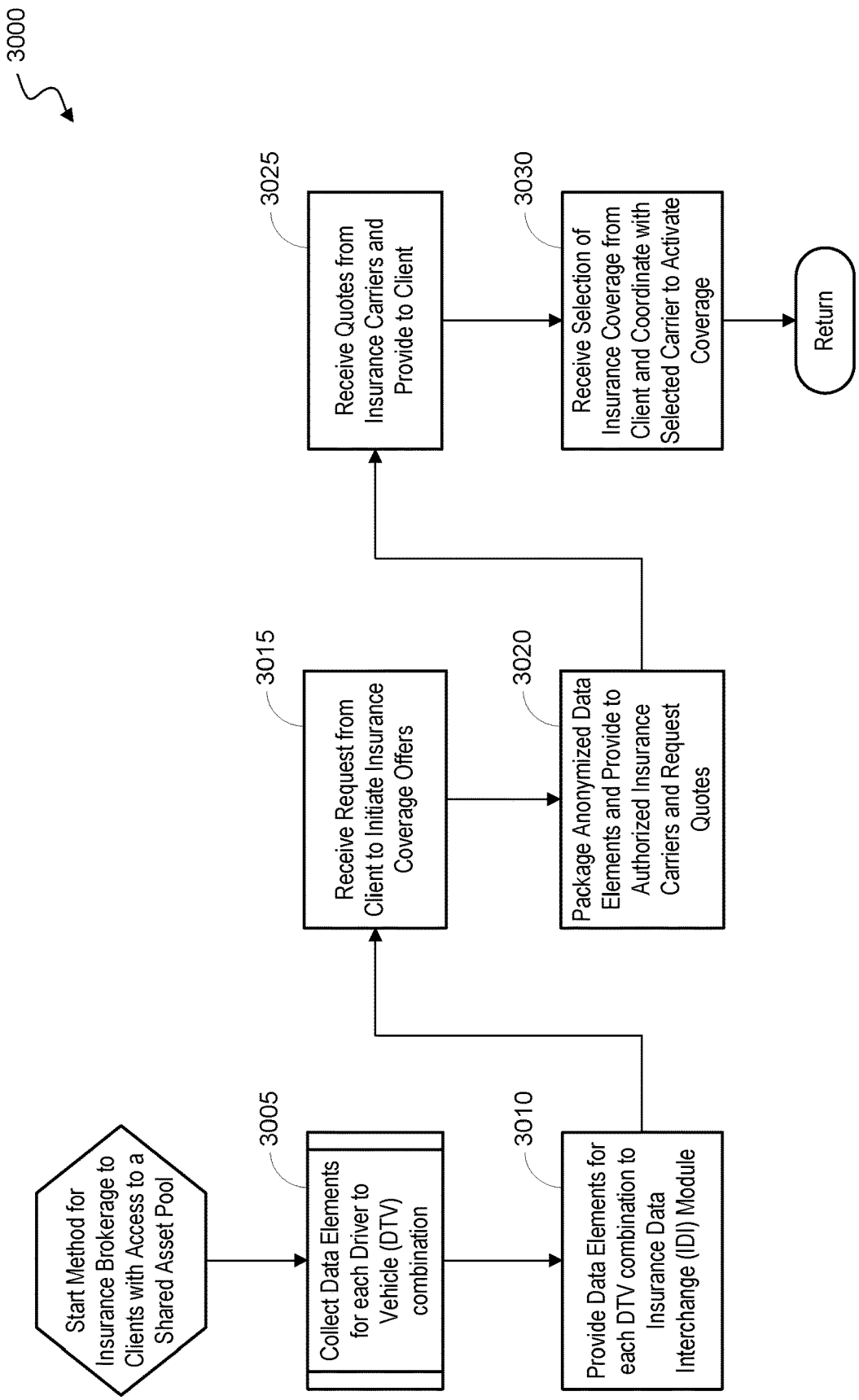
FIG. 4B is a flowchart illustrating a method for soliciting insurance quotations for clients of a subscription vehicle service.

FIG. 4B is a flowchart illustrating a method 3000 for soliciting insurance quotations for clients of a subscription vehicle service. Beginning at process block 3005, the service 2000 may collect data elements for each driver-to-vehicle ("DTV") combination. As previously described, the collected data elements may include, but are not limited to including, timestamp data associated with a vehicle asset "flip," driving history of the client, driving patterns, driving habits, vehicle asset condition, intended use of the vehicle, intended duration of DTV combination, vehicle asset value, etc.

Next, at block 3010 the collected data elements may be provided to the IDI module 2600 so that it may be leveraged for the purpose of dynamically adjusting insurance coverage in response to a client solicitation to one or more of the carriers 2700. At block 3015, the IDI module 2600 may receive a request from a client of the service 2000 to solicit insurance quotations from one or more carriers 2700 associated with the system 2000. Next, at block 3020, historical data associated with the client's use of the service 2000 (DTV pairings, driving patterns, driving habits/skills, etc.) may be anonymized and packaged for the various carriers 2700 and according to the individual preferences of the carriers 2700. As a simple example, carrier 2700A may require in its packaged quotation data from the IDI module 2600 geographic data indicating where a vehicle 101 may typically be located when it's paired with the client, while carrier 2700B may not require geographic location data for the vehicle asset 101 in its packaged data from the IDI module 2600.

Returning to the method 3000, at block 3025 the insurance carriers 2700 return quotes the IDI module 2600 for coverage of the client and/or the vehicle asset 101 in view of the client's anonymized historical data collected and aggregated by the service 2000. Notably, and as previously envisioned, the "quotes" received at block 3025 may also be an adjustment of an existing insurance policy provided by a single authorized carrier 2700, the policy being adjusted in view of updated and more recent historical data from service 2000. The method 3000 continues to block 3030 and a new insurance policy is selected and activated (or an existing policy modified). In this way, embodiments of the solution may efficiently optimize insurance coverage in view of historical and anonymized data collected in association with a client's use of a subscription vehicle service.

Figure 5A:
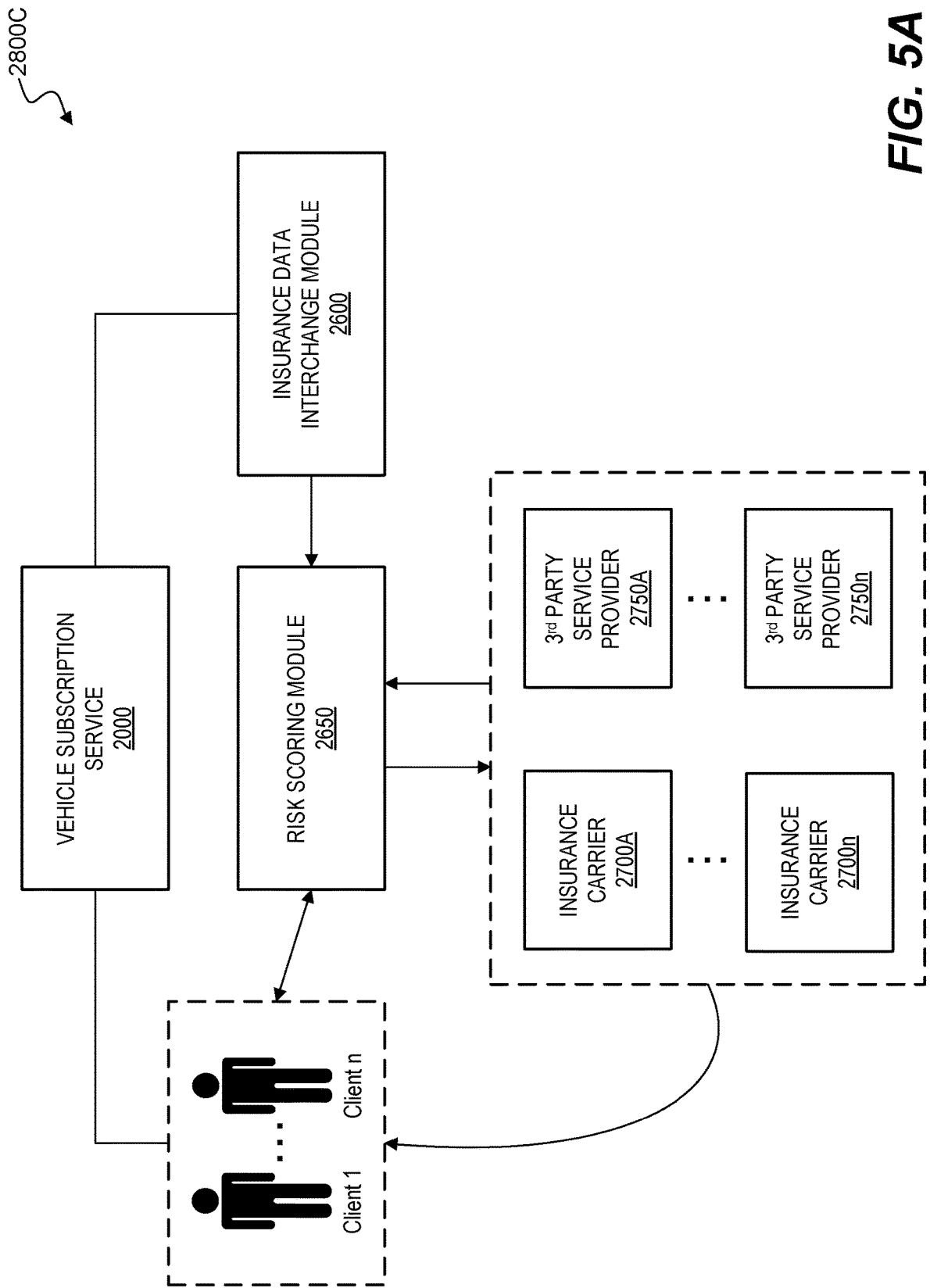
FIG. 5A is a functional block diagram illustrating an exemplary system according to the proposed solution for generating a trustworthiness score for clients of a subscription vehicle service.

FIG. 5A is a functional block diagram illustrating an exemplary system 2800C according to the proposed solution for generating a trustworthiness score for clients of a subscription vehicle service 2000. Embodiments of the solution such as that which is illustrated and described relative to FIG. 5 fulfills a need to quantify a consumer's "trustworthiness" in an access-based environment in which the consumer is not associated with ownership of any assets or otherwise attached to any liabilities associated with assets.

As can be seen in the FIG. 5A illustration, a pool of insurance carriers 2700 and/or third party service providers 2750 are in communication with the vehicle subscription service 2000 via the risk scoring module 2650 and the insurance data interchange ("IDI") module 2600. As clients to the service 2000 engage in various combinations with vehicles 101 according to their options within the service 2000, the service 2000 leverages various data inputs previously described (such as telematics, client inputs via PCDs, service personnel observations, etc.) to collect data elements in association with DTV combinations. The data elements may be provided to the IDI module 2600 for the purpose of packaging and provision to the risk scoring module 2650. The risk scoring module 2650 may use the collected data to calculate a trustworthiness score for the client. For example, condition of vehicle assets 101 when "flipped" by the client through the service 2000 may be a factor weighted in calculation of a trustworthiness score. As another non-limiting example, a percent of time that a client drives a vehicle asset 101 of the service 2000 above a posted speed limit may be a factor weighted in calculation of a trustworthiness score (other non-limiting examples of factors that may be leveraged by embodiments of the solution to generate a trustworthiness score are provided in the incorporated disclosures).

Using the data elements and the trustworthiness score, the insurance carriers 2700 may provide quotes for insurance coverage of a given client. Similarly, third party service and product providers 2750 may use the trustworthiness score to evaluate risk and make offers to the client of the subscription vehicle service 2000. In this way, the insurance coverage provided to a client of the service 2000 may be dynamically adjusted based on a client's trustworthiness score. Also, third party service and product providers may generate offers to clients of a subscription vehicle service 2000 based on the client's trustworthiness score generated in connection with the client's use of the service 2000.

Figure 5B:
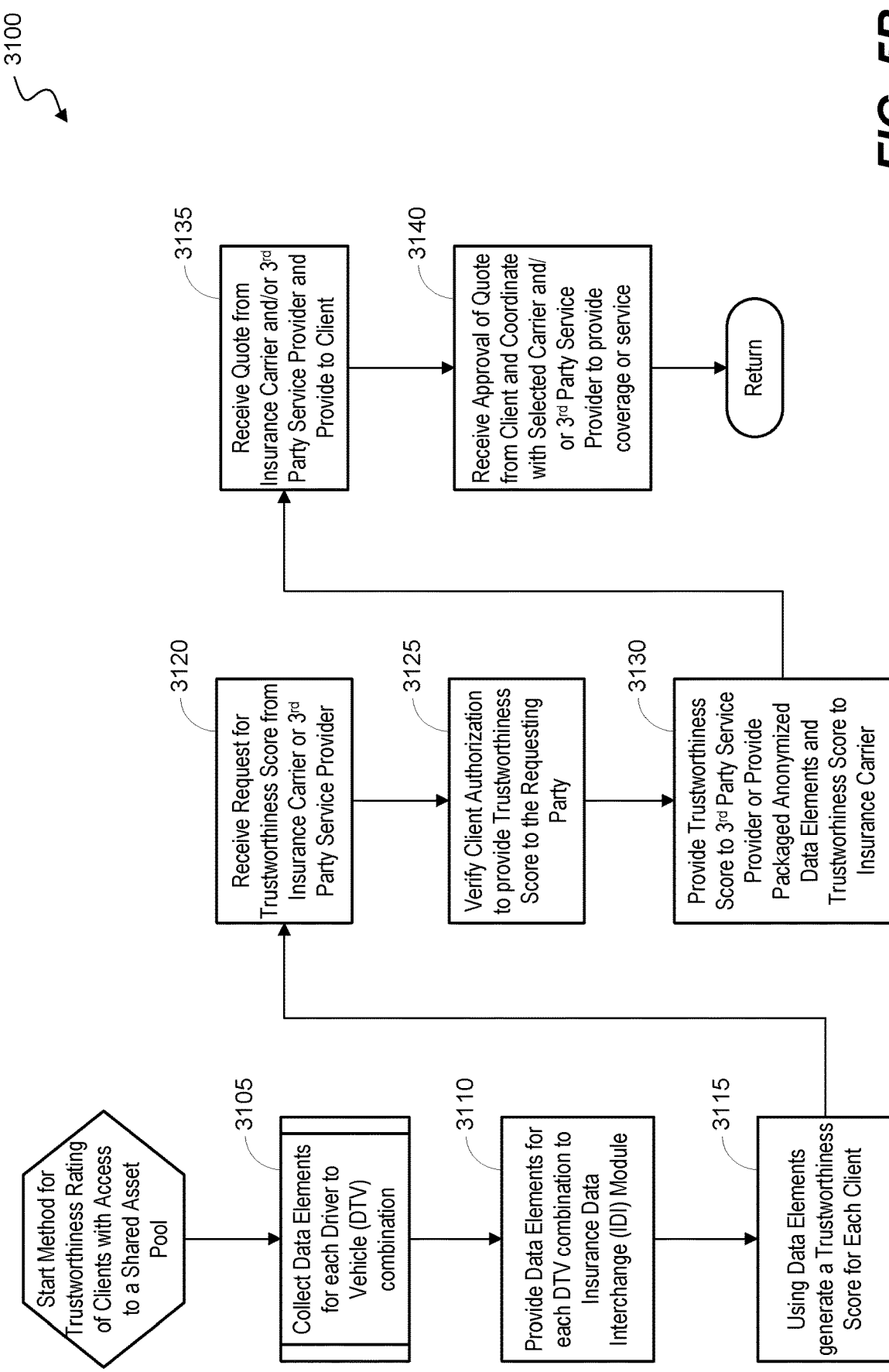
FIG. 5B is a flowchart illustrating a method for generating a trustworthiness score for clients of a subscription vehicle service.

FIG. 5B is a flowchart illustrating a method 3100 for generating a trustworthiness score for clients of a subscription vehicle service 2000. Beginning at process block 3105, the service 2000 may collect data elements for each driver-to-vehicle ("DTV") combination. As previously described, the collected data elements may include, but are not limited to including, timestamp data associated with a vehicle asset "flip," driving history of the client, driving patterns, driving habits, vehicle asset condition, intended use of the vehicle, intended duration of DTV combination, vehicle asset value, etc.

Next, at block 3110 the collected data elements may be provided to the IDI module 2600 so that it may be packaged and parsed for generation of a trustworthiness score. At block 3115, the IDI module 2600 may provide certain data elements to the risk scoring module 2650 to generate a trustworthiness score(s) for each client of the service 2000. Notably, it is envisioned that, depending on the particular insurance carrier 2700 or third party provider 2750 that requires a trustworthiness score for a client of the service 2000, a given client may have multiple trustworthiness scores. For example, an insurer 2700 may be more concerned about a client's driving habits whereas a third party provider of boat rentals may be more concerned about the client's propensity to take gentle care of an asset. As such, the risk scoring module 2650 may generate a trustworthiness score based on different data and weighting of the data depending upon the entity that requires the score.

Returning to the method 3100, at block 3120 the system 2000 may receive a request for a trustworthiness score of a client from an insurance carrier 2700 and/or a third party provider 2750. At block 3125, the system 2000 may verify that the client associated with the requested trustworthiness score has authorized generation and release of the score to the requesting party. Next, at block 3130 the trustworthiness score may be provided to the requesting party—if an insurance carrier 2700 is the requesting party, embodiments of the solution may also provide packaged data along with the trustworthiness score in order to provide the insurer 2700 with a comprehensive "picture" of the client for the purpose of evaluating and underwriting risk.

At block 3135, the requesting party may return a quotation or offer to the system 2000 which, in turn, makes it available to the client of the service 2000. Subsequently, at block 3140 the system 2000 may receive a selection of a quote or offer from the client, or otherwise receive acceptance of a quote or offer, and coordinate with the insurance provider 2700 or third party provider 2750 to provide the selected service to the client.

Figure 6A:
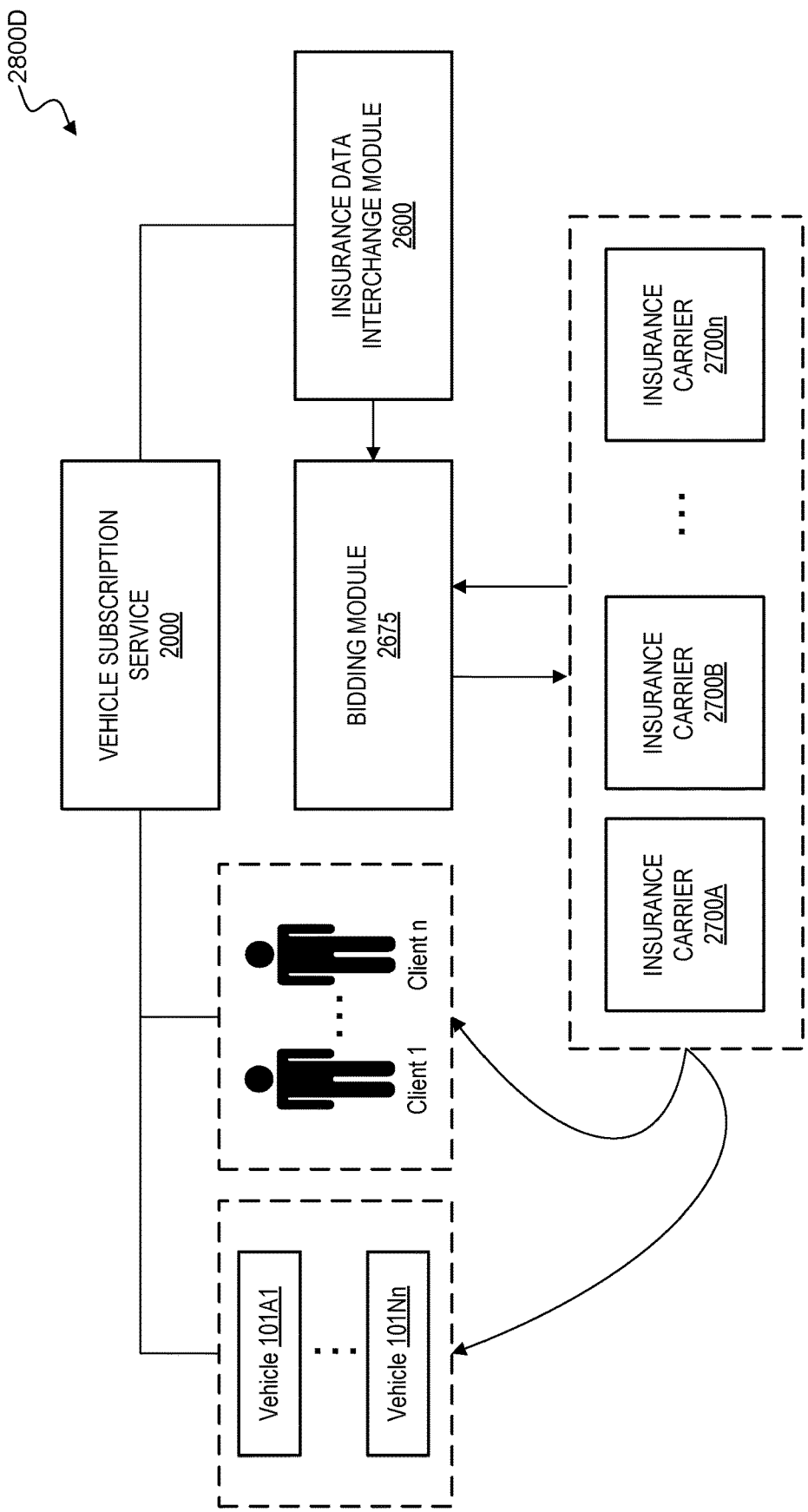
FIG. 6A is a functional block diagram illustrating an exemplary system according to the proposed solution for providing an insurance exchange for soliciting insurance quotations against specific risk pools associated with clients of a subscription vehicle service.

FIG. 6A is a functional block diagram illustrating an exemplary system 2800D according to the proposed solution for providing an insurance exchange for soliciting insurance quotations against specific risk pools associated with clients of a subscription vehicle service 2000. In the exemplary embodiment 2800D, the vehicle subscription service 2000 collects and aggregates data elements as clients to the service 2000 engage in various combinations with vehicles 101 according to their options within the service 2000. The service 2000 leverages various data inputs previously described (such as telematics, client inputs via PCDs, service personnel observations, etc.) to collect data elements in association with DTV combinations.

The collected and aggregated data is provided to the IDI module 2600 which, in turn, may parse the data and package it according to dedicated risk pools. For example, the IDI module 2600 may package a risk pool based on DTV pairs engaged in a commute. As another example, the IDI module 2600 may package a risk pool based on DTV pairs associated with a certain zip code. As yet another non-limiting example, the IDI module 2600 may package a risk pool based on DTV pairs associated with a certain class of vehicle assets 101. As yet another non-limiting example, the IDI module 2600 may package a risk pool based on groups of drivers with highly correlated behaviors as measured by telematics data and vehicle selection. The packaged risk pools may be provided to the bidding module 2675 so that carriers 2700 may bid on providing coverage to one or more of the various pools.

For example, carrier 2700A may be well positioned to provide insurance coverage for truck-type vehicle assets while carrier 2700B is better positioned to provide coverage for a risk pool defined by clients who predominantly use their vehicle assets for work commutes. In this way, it is an advantage of embodiments of the solution that insurance coverage may be adjusted and optimized based on aggregation of risk pools from active DTV pairings in a subscription vehicle service.

As another non-limiting example, the service 2000 may be configured via its IDI module 2600 to dynamically match pools of risk with the particular carrier 2700 best positioned to insure the pool. In such an embodiment, drivers in the risk pool may benefit from the optimization of coverage selection for the pool based on rules that consider the inherent trade-off between price and coverage levels. Drivers may further benefit from such embodiments due to the efficiency of having the service 2000 find and secure the most optimal coverage.

As another non-limiting example, the service 2000 may be configured to find coverage for pools of risk associated with a reinsurance market on behalf of a group of drivers who are collectively self-insuring (e.g., for a corporate fleet) or even the subscription service provider itself.

Figure 6B:
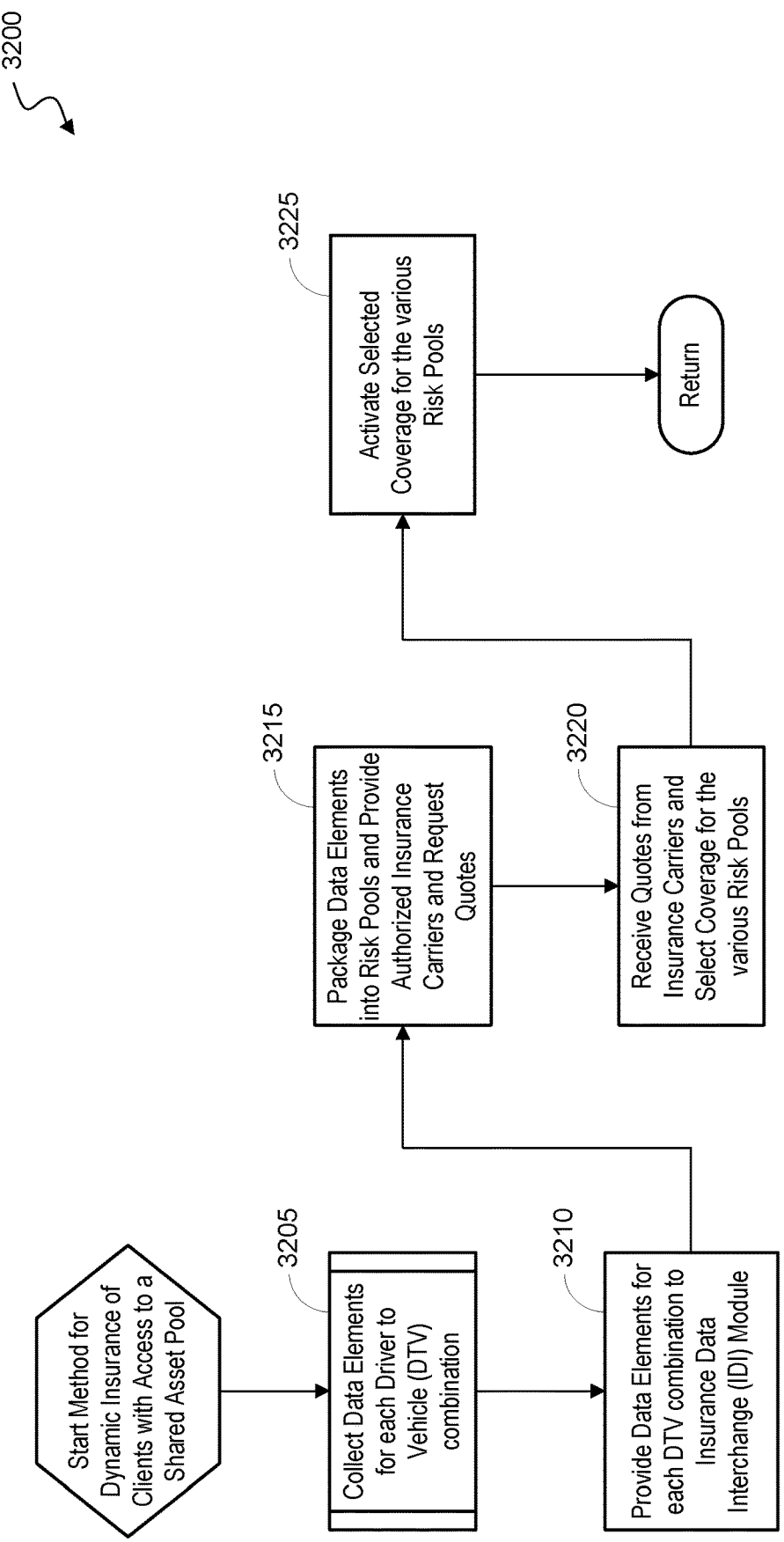
FIG. 6B is a flowchart illustrating a method for soliciting insurance quotations against specific risk pools associated with clients of a subscription vehicle service.

FIG. 6B is a flowchart illustrating a method 3200 for soliciting insurance quotations against specific risk pools associated with clients of a subscription vehicle service 2000. Beginning at process block 3205, the service 2000 may collect data elements for each driver-to-vehicle ("DTV") combination. As previously described, the collected data elements may include, but are not limited to including, timestamp data associated with a vehicle asset "flip," driving history of the client, driving patterns, driving habits, vehicle asset condition, intended use of the vehicle, intended duration of DTV combination, vehicle asset value, etc.

Next, at block 3210 the collected data elements may be provided to the IDI module 2600 so that it may be packaged and parsed for generation of one or more risk pools. At block 3215, the collected data may be packaged into risk pools and provided to one or more insurance carriers 2700 for quotation. At block 3220 insurance quotations may be returned to the system 2000 from the insurance carriers 2700 to cover one or more risk pools. For example, carriers 2700 may compete to underwrite all DTV pairs engaged in a commute for a certain percentage of driving time. Coverage(s) may be selected and, at block 3225, activated or otherwise accepted by the system 2000 and/or the clients of the system 2000.

Certain steps in the exemplary processes, process flows, and/or methods described herein naturally precede others for the invention to function as described. However, the invention is not limited to the order of the steps described if such order or sequence does not alter the functionality of the system and method of the present disclosure. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in the art of programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer readable medium. Computer-readable media comprise both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and Blu-ray disc where disks usually reproduce data magnetically, while discs reproduce data optically with lasers. Combinations of the above should also be included within the scope of computer-readable media.

Alternative embodiments for the system and method of the present disclosure will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for dynamic insurance of clients with access to a shared asset pool through a subscription vehicle service administered at least in part by a server and telematics devices uniquely associated with vehicles comprised in the shared asset pool, the method comprising:

maintaining a fleet of vehicles available for pairing with a plurality of clients of the subscription vehicle service, wherein pairing a client with a vehicle creates a driver-to-vehicle combination;

associating telematics devices with each of the vehicles of the fleet of vehicles paired with a client;

enabling remote electronic communication over a communications network between the telematics devices and the server;

the telematics devices collecting data elements associated with each driver-to-vehicle combination in the subscription vehicle service, wherein one or more of the data elements are indicative of driving habits;

the telematics devices transmitting, over the communications network, the collected data elements to the server;

the server storing in a database the data elements collected by, and received from, the telematics devices to establish a record of historical data elements;

for a given client, the server recognizing an electronic request for generation of a new driver-to-vehicle combination, wherein generating the new driver-to-vehicle combination coincides with terminating a previous driver-to-vehicle combination;

the server packaging historical data elements associated with previous driver-to-vehicle combinations of the given client and providing the packaged data elements to one or more insurance providers, wherein the data elements are packaged according to predefined preferences of the one or more insurance providers;

the server receiving quotations from the one or more insurance providers for insurance policies to insure the new driver-to-vehicle combination;

based on the quotations, the server selecting an insurance policy;

the server simultaneously activating the selected insurance policy for the new driver-to-vehicle combination and terminating an insurance policy for the previous driver-to-vehicle combinations;

the server anonymizing data elements associated with the client;

the server packaging the anonymized data elements and providing to one or more of the insurance providers;

the server receiving updated quotations from the one or more insurance providers for insurance policies based on the anonymized data elements;

the server comparing the updated quotations with the selected insurance policy; and if a preferred updated quotation is preferable to the selected insurance policy, the server simultaneously activating the insurance policy associated with the preferred updated quotation and terminating the selected insurance policy.

2. The method of claim 1, wherein the selected insurance policy is associated with the client in the new driver-to-vehicle combination.

3. The method of claim 1, wherein the selected insurance policy is associated with the vehicle in the new driver-to-vehicle combination.

4. The method of claim 1, wherein the insurance policy associated with the preferred updated quotation is underwritten by the same insurance provider as the selected insurance policy.

5. The method of claim 1, wherein the one or more insurance providers are authorized by the client.

6. A computer program product comprising a computer usable device having a computer readable program code embodied therein, said computer readable program code adapted to be executed to implement a method for dynamic insurance of clients with access to a shared asset pool through a subscription vehicle service, the method comprising:

collecting data elements associated with each driver-to-vehicle combination in the subscription vehicle service, wherein one or more of the data elements are indicative of driving habits and are collected using telematics devices associated with vehicles;

storing in a database the data elements collected by the telematics devices to establish a record of historical data elements;

for a given client, a server recognizing a request for generation of a new driver-to-vehicle combination, wherein generating the new driver-to-vehicle combination coincides with terminating a previous driver-to-vehicle combination;

the server packaging historical data elements associated with previous driver-to-vehicle combinations of the given client and providing the packaged data elements to one or more insurance providers, wherein the data elements are packaged according to predefined preferences of the one or more insurance providers;

the server receiving quotations from the one or more insurance providers for insurance policies to insure the new driver-to-vehicle combination;

based on the quotations, the server selecting an insurance policy;

the server simultaneously activating the selected insurance policy for the new driver-to-vehicle combination and terminating an insurance policy for the previous driver-to-vehicle combinations;

the server anonymizing data elements associated with the client;

the server packaging the anonymized data elements and providing to one or more of the insurance providers;

the server receiving updated quotations from the one or more insurance providers for insurance policies based on the anonymized data elements;

the server comparing the updated quotations with the selected insurance policy; and if a preferred updated quotation is preferable to the selected insurance policy, the server simultaneously activating the insurance policy associated with the preferred updated quotation and terminating the selected insurance policy.

7. The computer program product of claim 6, wherein the selected insurance policy is associated with the client in the new driver-to-vehicle combination.

8. The computer program product of claim 6, wherein the selected insurance policy is associated with the vehicle in the new driver-to-vehicle combination.

9. The computer program product of claim 6, wherein the insurance policy associated with the preferred updated quotation is underwritten by the same insurance provider as the selected insurance policy.

* * * * *